United States Patent
Hong

(10) Patent No.: US 11,523,303 B2
(45) Date of Patent: Dec. 6, 2022

(54) METHOD AND DEVICE FOR TRANSMITTING DATA

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/277,714

(22) PCT Filed: Sep. 19, 2019

(86) PCT No.: PCT/KR2019/012156
§ 371 (c)(1),
(2) Date: Mar. 18, 2021

(87) PCT Pub. No.: WO2020/060234
PCT Pub. Date: Mar. 26, 2020

(65) Prior Publication Data
US 2021/0352525 A1    Nov. 11, 2021

(30) Foreign Application Priority Data

Sep. 21, 2018 (KR) .................. 10-2018-0113549
May 24, 2019 (KR) .................. 10-2019-0061275
Sep. 18, 2019 (KR) .................. 10-2019-0114503

(51) Int. Cl.
*H04W 28/06* (2009.01)
*H04L 1/16* (2006.01)
(Continued)

(52) U.S. Cl.
CPC .......... *H04W 28/06* (2013.01); *H04L 1/1614* (2013.01); *H04W 28/0252* (2013.01); *H04W 80/02* (2013.01)

(58) Field of Classification Search
CPC ....... H04L 1/08; H04L 1/1614; H04L 5/0053; H04L 5/0098; H04L 47/283;
(Continued)

(56) References Cited

U.S. PATENT DOCUMENTS

2018/0098250 A1    4/2018   Vrzic et al.
2018/0199315 A1    7/2018   Hong et al.
(Continued)

FOREIGN PATENT DOCUMENTS

KR    10-2018-0081446 A    7/2018
WO    2018/164499 A1        9/2018

OTHER PUBLICATIONS

Huawei et al., "Leftover Issues of MAC CE activation/deactivation of PDCP duplication", R2-1812075, 3GPP TSG-RAN2 Meeting #103, Gothenburg, Sweden, Aug. 20-24, 2018.
(Continued)

*Primary Examiner* — Kan Yuen
(74) *Attorney, Agent, or Firm* — IP Legal Services, LLC

(57) ABSTRACT

Provided are methods and devices for data duplicate transmission in a next-generation/5G radio access network. The method of a UE for transmitting data may include configuring a plurality of radio link control (RLC) objects which are linked to a single packet data convergence protocol (PDCP) object and used to process duplicate transmission for a wireless bearer, on the basis of configuration information for configuring duplicate transmission of data received from a base station; receiving a MAC control element comprising indication information indicating an activation state change for the plurality of RLC objects; changing, to an active state, an RLC object indicated by the indication information to be in the active state; and performing duplicate transmission of the data using the activated RLC object.

11 Claims, 17 Drawing Sheets

(51) Int. Cl.
*H04W 28/02* (2009.01)
*H04W 80/02* (2009.01)

(58) Field of Classification Search
CPC . H04W 28/0252; H04W 28/06; H04W 80/02;
H04W 76/15; H04W 76/27
See application file for complete search history.

(56) References Cited

U.S. PATENT DOCUMENTS

| | | | |
|---|---|---|---|
| 2019/0253926 A1* | 8/2019 | Kim | H04W 28/06 |
| 2019/0268799 A1 | 8/2019 | Hong et al. | |
| 2019/0394693 A1* | 12/2019 | Kim | H04W 24/08 |
| 2020/0374752 A1* | 11/2020 | Xiao | H04L 1/1864 |
| 2021/0126746 A1* | 4/2021 | Li | H04L 5/0044 |
| 2021/0144583 A1* | 5/2021 | Xiao | H04W 76/27 |
| 2021/0297899 A1* | 9/2021 | Baek | H04W 48/16 |

OTHER PUBLICATIONS

Qualcomm Incorporated, "Remaining issues on PDCP duplication", R2-1805273, 3GPP TSG-RAN WG2 Meeting #101 bis, Sanya, China, Apr. 16-20, 2018.

* cited by examiner

FIG.12

| D7 | D6 | D5 | D4 | D3 | D2 | D1 | D0 |
|----|----|----|----|----|----|----|----|
| Logical Channel ID of D0 | | | | | | Cell Group ID of D0 | |

| Logical Channel ID of D0 | Cell Group ID of D0 |
|---|---|
| Logical Channel ID of D1 | Cell Group ID of D1 |
| Logical Channel ID of D2 | Cell Group ID of D2 |
| Logical Channel ID of D3 | Cell Group ID of D3 |
| Logical Channel ID of D4 | Cell Group ID of D4 |
| Logical Channel ID of D5 | Cell Group ID of D5 |
| Logical Channel ID of D6 | Cell Group ID of D6 |
| Logical Channel ID of D7 | Cell Group ID of D7 |

*FIG.13*

| D7 | D6 | D5 | D4 | D3 | D2 | D1 | D0 |
|----|----|----|----|----|----|----|----|
| D1 duplicate transmission path |||| D0 duplicate transmission path ||||
| D3 duplicate transmission path |||| D2 duplicate transmission path ||||
| D5 duplicate transmission path |||| D4 duplicate transmission path ||||
| D7 duplicate transmission path |||| D6 duplicate transmission path ||||

*FIG.14*

| D7 = 0 | D6 = 0 | D5 = 1 | D4 = 1 | D3 = 0 | D2 = 1 | D1 = 1 | D0 = 0 |
|---|---|---|---|---|---|---|---|
| D2 duplicate transmission path |||| D1 duplicate transmission path ||||
| D5 duplicate transmission path |||| D4 duplicate transmission path ||||

FIG.15

| SCG3-1 | SCG3-0 | SCG2-1 | SCG2-0 | SCG1-1 | SCG1-0 | MCG-1 | MCG-0 |
|---|---|---|---|---|---|---|---|

METHOD AND DEVICE FOR TRANSMITTING DATA

CROSS REFERENCE TO RELATED APPLICATIONS

This application is a National Stage Patent Application of PCT International Patent Application No. PCT/KR2019/012156 (filed on Sep. 19, 2019) under 35 U.S.C. § 371, which claims priority to Korean Patent Application Nos. 10-2018-0113549 (filed on Sep. 21, 2018), 10-2019-0061275 (filed on May 24, 2019), and 10-2019-0114503 (filed on Sep. 18, 2019), the teachings of which are incorporated herein in their entireties by reference.

TECHNICAL FIELD

The present disclosure relates to methods and devices for data duplicate transmission in a next-generation/5G radio access network (hereinafter, referred to as a new radio (NR)).

BACKGROUND ART

As communication systems have been developed, various types of wireless terminals have been introduced to consumers such as companies and individuals.

Mobile communication systems employing technologies related to 3rd generation partnership project (3GPP), such as long term evolution (LTE), LTE-Advanced, fifth generation (5G), or the like, have been designed for transmitting and receiving a large amount of various data, such as video data, radio data, etc. at a high speed, beyond voice-oriented communication.

After LTE-Advanced, technologies for next generation radio access networks have been developed for enabling a terminal such as a user equipment as in the 3GPP to transmit and receive a larger amount of data and provide a higher quality of service (QoS). For example, many studies and researches have been in progress to develop 5G network in 3GPP.

Meanwhile, a base station may configure a plurality of cells and increase data transmission and reception rates of a user equipment and capabilities of the user equipment to transmit/receive data, using the plurality of cells. For example, the base station and the user equipment may meet user's requirements through carrier aggregation (CA) configured based on a plurality of carriers.

In particular, in order to provide reliably a service with low latency, such as ultra-reliable and low-latency communications (URLLC), it is necessary to transmit/receive data without loss at an even higher speed. To this end, there is need to develop technology for transmitting data duplicately using a plurality of cells, and at the same time, securing reliability to the related service.

However, until now, no specific method or related technology has been introduced or developed for allowing a user equipment to perform the duplicate transmission of data through one radio bearer and for dynamically performing the duplicate transmission according to various requirements.

DETAILED DESCRIPTION OF THE INVENTION

Technical Problem

Embodiments described herein relate to methods and devices for dynamically performing duplicate transmission using the next-generation radio access technology.

Technical Solution

To address the above issues, in accordance with one aspect of the present disclosure, there is provided a method of a user equipment for transmitting data. The method may include configuring a plurality of radio link control (RLC) entities used for processing duplicate transmission for a radio bearer with being associated with one packet data convergence protocol (PDCP) entity based on configuration information for configuring data duplicate transmission which is received from a base station, receiving a medium access control (MAC) control element (CE) including indication information for indicating activation status change for the plurality of RLC entities, changing an RLC entity indicated as activation status to the activation status according to the indication information, and duplicately transmitting data using the activated RLC entity.

In accordance with another aspect of the present disclosure, there is provided a method of a base station for controlling a data transmission of a user equipment. The method may include transmitting, to a user equipment, configuration information for configuring, for the user equipment, a plurality of radio link control (RLC) entities used for processing duplicate transmission for a radio bearer with being associated with one packet data convergence protocol (PDCP) entity, transmitting indication information for indicating activation status change for the plurality of RLC entities to the user equipment, and receiving data duplicately transmitted through an RLC entity activated according to the indication information, the configuration information including at least one of RLC entity index information and initial activation status information for each of the plurality of RLC entities.

In accordance with further another aspect of the present disclosure, a user equipment is provided for transmitting data. The user equipment may include a controller for configuring a plurality of radio link control (RLC) entities used for processing duplicate transmission for a radio bearer with being associated with one packet data convergence protocol (PDCP) entity based on configuration information for configuring data duplicate transmission which is received from a base station, a receiver for receiving a medium access control (MAC) control element (CE) including indication information for indicating activation status change for the plurality of RLC entities, and a transmitter for duplicately transmitting data using an activated RLC entity, the controller changing an RLC entity indicated as activation status to the activation status according to the indication information.

In accordance with yet another aspect of the present disclosure, a base station for controlling a data transmission of a user equipment. The base station may include a transmitter for transmitting, to a user equipment, configuration information for configuring, for the user equipment, a plurality of radio link control (RLC) entities used for processing duplicate transmission for a radio bearer with being associated with one packet data convergence protocol (PDCP) entity, and transmitting indication information for indicating activation status change for the plurality of RLC entities to the user equipment, and a receiver for receiving data duplicately transmitted through an RLC entity activated according to the indication information, the configuration information including at least one of RLC entity index information for each of the plurality of RLC entities and initial activation status information.

Effects of the Invention

In accordance with aspects of the present disclosure, duplicate transmission functionality may be dynamically implemented using the next-generation radio access technology.

BRIEF DESCRIPTION OF THE DRAWINGS

The above and other aspects, features, and advantages of the present disclosure will be more apparent from the following detailed description taken in conjunction with the accompanying drawings, in which:

FIG. 12 illustrates a MAC CE for indicating duplicate transmission paths according to still another embodiment of the present disclosure;

FIG. 13 illustrates a MAC CE for indicating duplicate transmission paths according to further another embodiment of the present disclosure;

FIG. 14 illustrates a MAC CE for indicating duplicate transmission paths according to yet another embodiment of the present disclosure;

FIG. 15 illustrates a MAC CE for indicating a duplicate transmission according to still further another embodiment of the present disclosure;

BEST MODE FOR CARRYING OUT THE INVENTION

Figure 1:
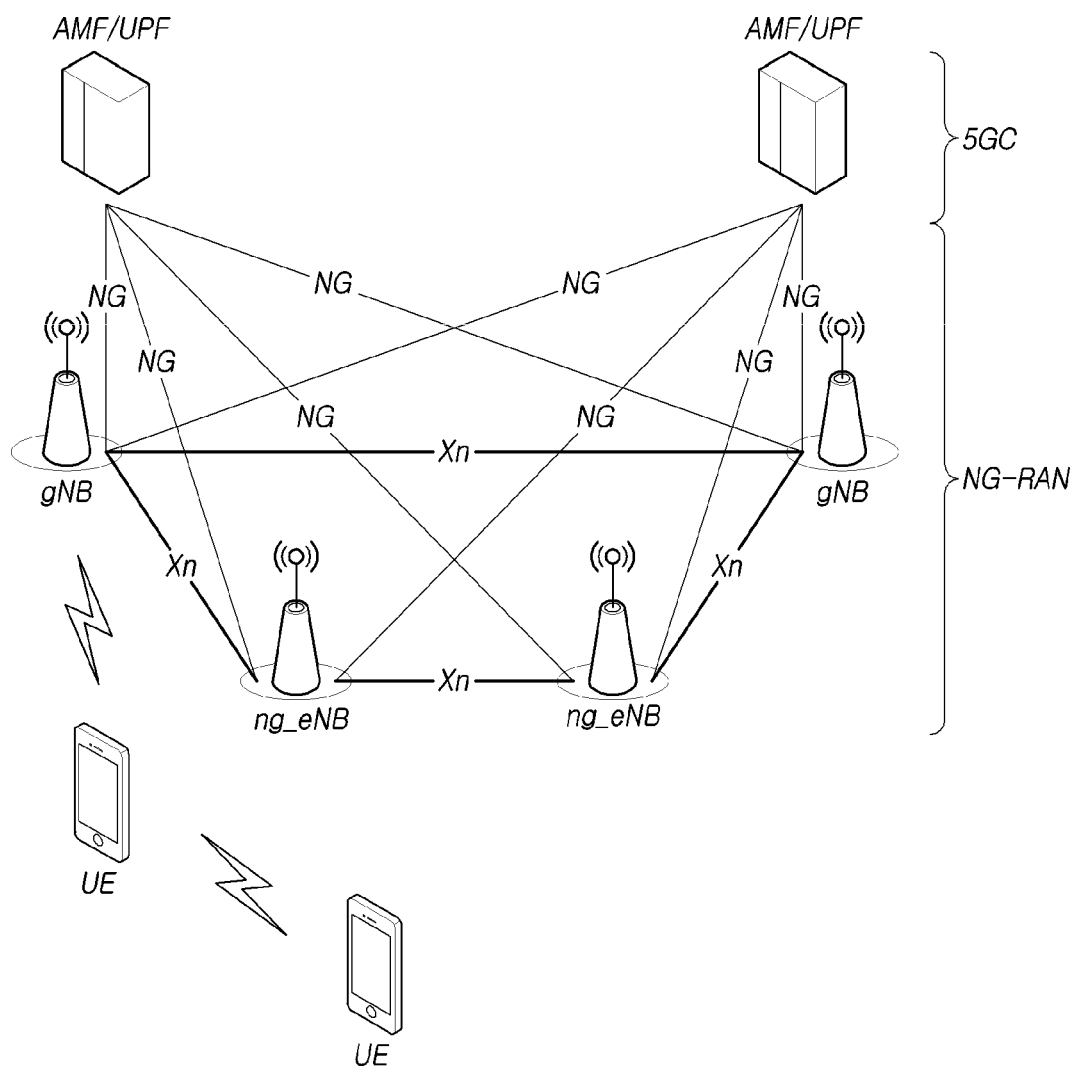
FIG. 1 is a view schematically illustrating an NR wireless communication system according to an embodiment of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 schematically illustrates an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols.

Figure 2:
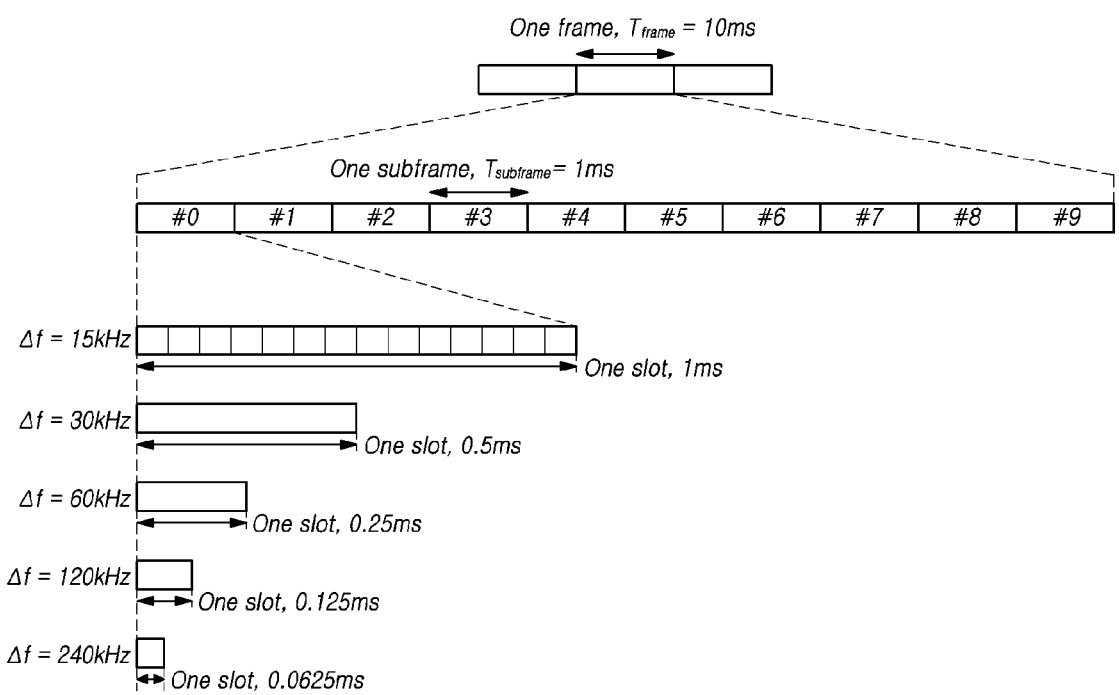
FIG. 2 illustrates a frame structure in an NR system according to an embodiment of the present disclosure.

FIG. 2 illustrates a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
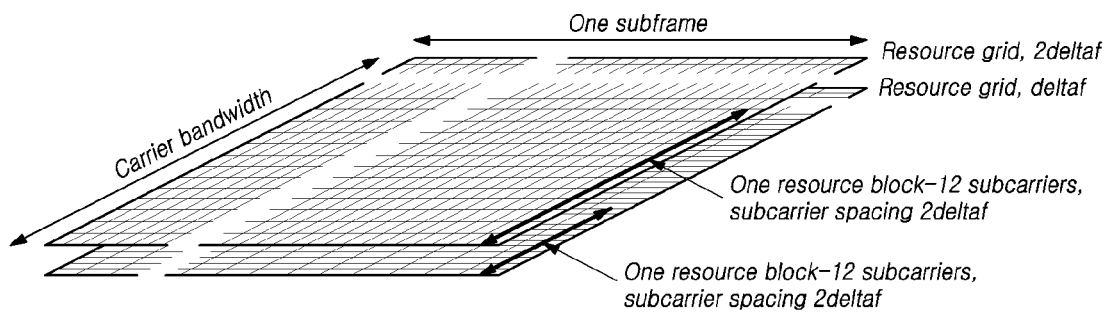
FIG. 3 illustrates resource grids supported by a radio access technology according to an embodiment of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
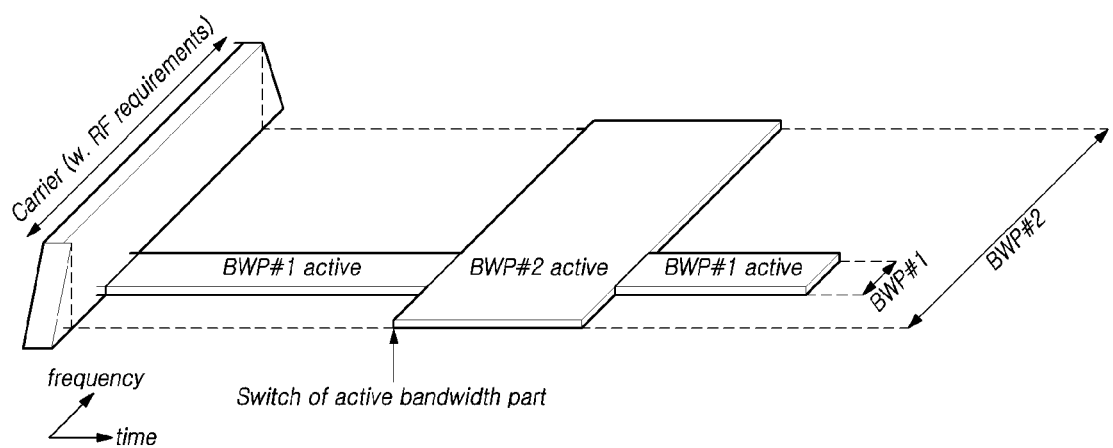
FIG. 4 illustrates bandwidth parts supported by a radio access technology according to an embodiment of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
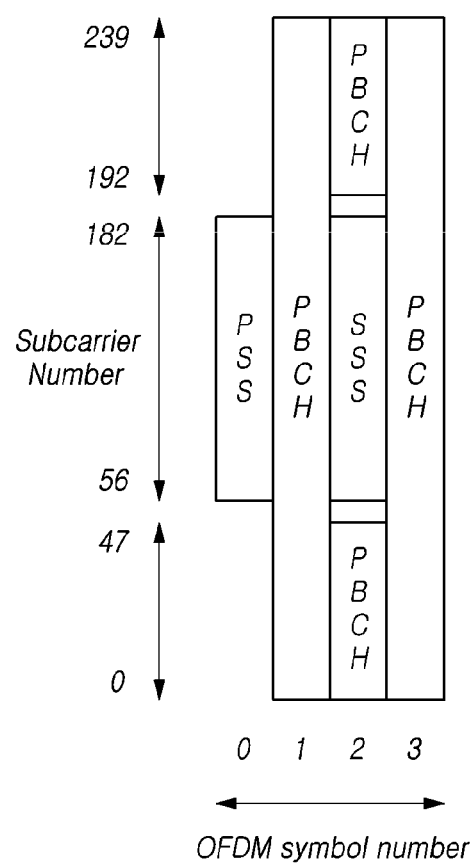
FIG. 5 illustrates a synchronization signal block in a radio access technology according to an embodiment of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
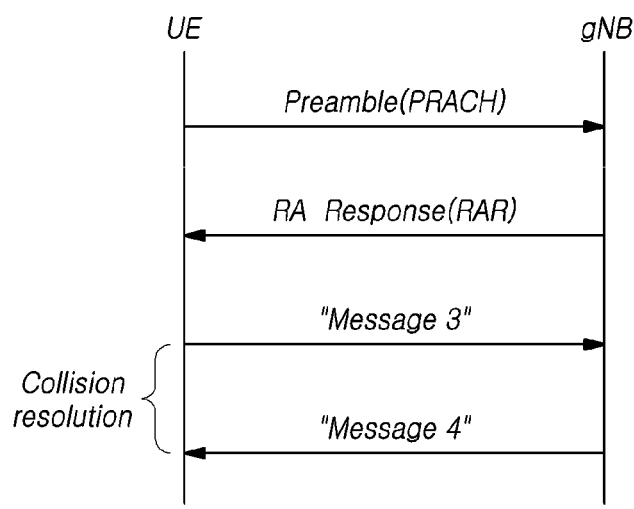
FIG. 6 is a signal diagram for explaining a random access procedure in a radio access technology according to an embodiment of the present disclosure.

FIG. 6 illustrates a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
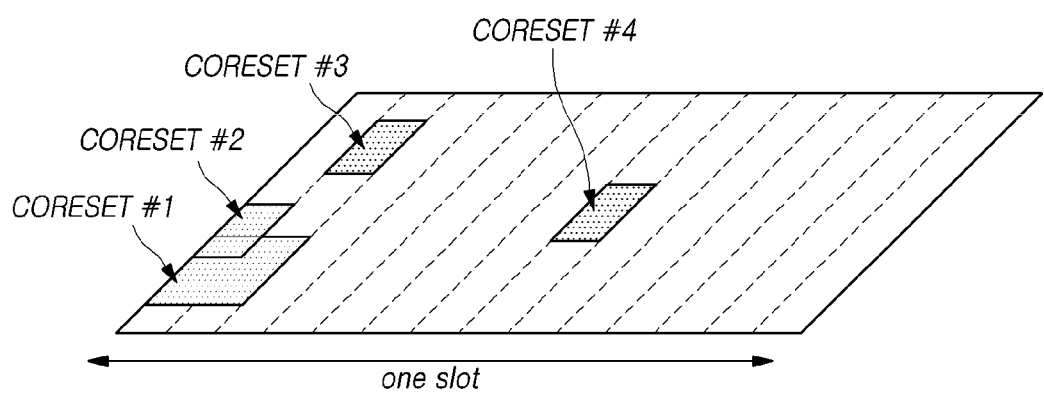
FIG. 7 illustrates a CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

Meanwhile, in the present specification, a NB-IoT (NarrowBand Internet of Things) UE or an IoT UE means a UE that supports wireless access for cellular IoT. The objectives of NB-IoT technology include improved indoor coverage, support for large-scale low-speed UEs, low latency sensitivity, ultra-low cost UEs, low power consumption, and an optimized network structure. In addition, the present technical idea may be applied not only to communication between a UE and a base station, but also to communication between UEs (Device to Device), sidelink communication (Sidelink), and vehicle communication (V2X). In particular, it can be applied to communication between UEs in the next-generation radio access technology, and terms such as signals and channels in this specification can be variously modified and applied according to the type of communication between UEs.

For example, PSS and SSS are respectively PSSS (Primary D2D Synchronization Signal) and SSSS (Secondary D2D Synchronization Signal) may be changed and applied. In addition, the channel for transmitting broadcast information such as the above-described PBCH is changed to PSBCH, the channel for transmitting data in the sidelink such as PUSCH and PDSCH is changed to PSSCH, and the channel for transmitting control information such as PDCCH and PUCCH is changed to PSCCH. Can be applied. In addition, in communication between UEs, a discovery signal is required, which is transmitted and received through the PSDCH. However, it is not limited to these terms.

Hereinafter, in the present specification, the technical idea is described on an exemplary basis for communication between a UE and a base station, but the present technical idea may be applied by replacing a base station node with another UE as needed.

NR(New Radio)

NR is a next-generation wireless communication technology that is being standardized in the 3GPP. That is, NR is radio access technology that may provide an enhanced data rate compared to LTE and may satisfy various QoS requirements required for specific and detailed usage scenarios. In particular, as a representative NR usage scenario, eMBB (enhancement Mobile Broadband), mMTC (massive MTC) and URLLC (Ultra Reliable and Low Latency Communications) have been defined. In order to meet the requirements for each scenario, it is required to design a frame structure more flexible as compared to that of LTE. For example, each use scenario has different requirements in light of data rate, latency, reliability, and coverage. Therefore, as a method to efficiently satisfy the requirements for each usage scenario through the frequency band constituting an arbitrary NR system, it has been designed to efficiently multiplex radio resource units which are based on different numerologies (e.g., subcarrier spacing, subframe, TTI, etc.).

As an example, for the numerology which has different subcarrier spacing values, there are discussions about a method of multiplexing and supporting based on TDM, FDM, or TDM/FDM via one or more NR component carriers and a scheme for supporting one or more time units in configuring a scheduling unit in the time domain. In this regard, in NR, a subframe was defined as a type of time domain structure, and a 15 kHz SCS (Sub-Carrier Spacing) identical to LTE is configured as a reference numerology for defining a corresponding subframe duration. Therefore, a single subframe duration is defined which is constituted of 14 OFDM symbols of 15 kHz SCS-based normal CP overhead. That is, in NR, a subframe has a time duration of 1 ms.

However, unlike LTE, the subframe of NR is absolute reference time duration and, as a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Therefore, a slot is constituted of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot is defined. The mini-slot is constituted of a smaller number of symbols than the typical slot described above. For minislot-based uplink/downlink data transmission/reception, a short-length time-domain scheduling interval may be set, or a long-length time-domain scheduling interval for uplink/downlink data transmission/reception may be configured via slot aggregation. In particular, in the case where latency-sensitive data, such as URLLC, is transmitted or received, if scheduling is performed in slot units which are based on 1 ms (14 symbols) as defined in the numerology-based frame structure which has a small SCS value, e.g., 15 kHz, the latency requirements may be hard to meet. Thus, a mini-slot constituted of a smaller number of OFDM symbols than the slot constituted of 14 symbols may be defined and, based thereupon, scheduling capable of meeting the URLLC requirements may be carried out.

As described above, numerologies having different SCS values in one NR carrier can be multiplexed using the TDM or FDM technique, and such multiplexed numerologies can be used for satisfying the requirements. Therefore, methods of scheduling data in line with latency requirements based on a length of the slot (or mini-slot) for each numerology may be considered. For example, as a symbol length in an SCS of 60 kHz is reduced by about ¼ of a symbol length in an SCS of 15 kHz, when one slot with 14 OFDM symbols is equally configured in these SCSs, while a slot length based on the 15 kHz SCS becomes 1 ms, a slot length based on the 60 kHz SCS is reduced to about 0.25 ms.

Packet Duplication Transmission

In the NR, a packet duplicate transmission technology is introduced as one of solutions for supporting the URLLC service. When duplicate transmission is configured for one radio bearer by radio resource control (RRC), one secondary RLC entity and one secondary logical channel may be added to the radio bearer for processing duplicate PDCP PDUs. The duplicate transmission in a corresponding PDCP entity may be configured to submit identical PDCP PDUs two times (once to the primary RLC entity and a second time to the secondary RLC entity). Packet duplicate transmission may be processed with two independent transmission paths. Thus, the packet duplicate transmission improves data transmission credibility and reduces delay.

When duplicate transmission is activated, an original PDCP PDU and a duplicate PDCP PDU thereof are not transmitted over the same carrier. Two different logical channels may be included in an identical MAC entity (CA situation) or different MAC entities (DC situation). In the case of the CA, a logical channel mapping restriction operation is performed in an associated MAC entity so that a logical channel carrying an original PDCP PDUs and a logical channel carrying a duplicate PDCP PDUs for duplicate transmission cannot be transmitted over the same carrier. When one RLC entity identifies the transmission of one PDCP PDU, an associated PDCP entity may instruct one or more remaining RLC entities to discard the corresponding PDCP PDU.

When configuring duplicate transmission for one DRB, RRC sets an initial state (activation or deactivation). After the duplicate transmission is configured, a state of the duplicate transmission may be dynamically controlled through a MAC CE. In the case of the DC, a UE applies MAC CE commands regardless of MCG or SCG.

In this manner, the typical packet transmission technology has been provided through two independent RLC entities and logical channels. Meanwhile, in a situation where extreme reliability and low latency are needed, such as industrial IoT, a data duplicate transmission through two or more independent transmission paths may provide better reliability and lower latency. However, such a data duplicate transmission technology through two or more independent transmission paths has not been introduced. It is necessary to dynamically provide the duplicate transmission technology using two independent transmission paths and the duplicate transmission technology using transmission paths more than two paths taking account of overhead in a radio network.

To address this issue, the present disclosure introduces a data duplicate transmission technology capable of satisfying of the URLLC requirements by dynamically controlling duplicate transmission using more than two transmission paths while minimizing an increase of overhead in the radio network.

Hereinafter, discussions are conducted based on the NR for convenience of description. However, this is merely for convenience of description; therefore, embodiments presented throughout the present disclosure may be also applied to cases that use unlicensed bands in the LTE or any radio access networks, and thus, such applications are included in the scope of the present disclosure. Meanwhile, embodiments presented throughout the present disclosure may be applied Dual Connectivity (DC) or Multi-RAT DC (MR-DC). For example, embodiments described herein may be used in one or more of the following environments.

EN-DC: E-UTRA-NR Dual Connectivity
NGEN-DC: NG-RAN E-UTRA-NR Dual Connectivity
NE-DC: NR-E-UTRA Dual Connectivity
NN-DC: NR-NR Dual Connectivity
EE-DC: E-UTRA-E-UTRA Dual Connectivity Embodiments described herein may include specifications of information elements and procedures specified in TS 38.331 for NR Radio Resource Control (RRC) protocol specification or TS 38.323 for NR Packet Data Convergence Protocol (PDCP) specification. Even though definitions of the information elements and descriptions of related procedures is not included herein, corresponding specifications specified in these standard may be included in the present disclosure or incorporated into claims.

Embodiments described below may be applicable to cases (e.g., CA situation) that duplicately transmit data through two or more paths in one cell group (CG). Embodiments described below may be also applicable to cases (e.g., multi connectivity (MC)) that duplicately transmit data through one master cell group (MCG) and one or more secondary cell groups (SCG). Embodiments described below may be also applicable to cases that duplicately transmit data through two or more paths by combining the CA duplicate transmission and the DC/MC duplicate transmission. For example, data may be duplicately transmitted through a total of three transmission paths resulting from combining two transmission paths through a CA duplicate transmission in one MCG and one transmission path in one SCG.

In a 5G environment in which multiple small cells are closely deployed, a UE may be placed in two or more overlapped cells or two or more base station coverages. In a situation where extreme reliability and low latency are needed, such as industrial IoT, a data duplicate transmission through two or more independent transmission paths provides better reliability and lower latency. In particular, when radio quality becomes unstable due to a movement of a UE, a blockage in a cell that uses a high frequency or the like, it may be desirable to use two or more independent transmission paths. However, when radio quality is stable in a good state, using two or more independent transmission paths even leads resource efficiency to be degraded. Accordingly, in a state where duplicate transmission for allowing a UE to use two or more independent transmission paths is configured, it may be desirable to efficiently use resources by selecting duplicate transmission paths.

However, a technology to support this in the NR has not been introduced yet. That is, when configuring duplicate transmission for one DRB, RRC sets an initial state (activation or deactivation). A base station may indicate the initial state of the duplicate transmission (or a state of uplink duplication) to a UE through one information element (pdcp-Duplication) included in PDCP configuration information. When this is set to True, the duplicate transmission is activated. Otherwise, the duplicate transmission is deactivated.

Accordingly, the present disclosure introduces, operations of a UE and a base station for dynamically controlling multiple transmission paths. Herein, the term "transmission path" denotes a path through which data are transmitted from a PDCP entity to a specific cell through a RLC entity, a MAC entity, and a PHY entity. In particular, when multiple RLC entities are configured for duplicate transmission, RLC entities for transmitting one or more PDCP PDUs may be differently selected, this may be referred to as "different transmission paths" for discussion. Likewise, even when MAC entities and PHY entities and cells in radio networks are different, the expression of "different transmission paths" may be used for discussion. That is, in order for identical data to be duplicately transmitted, when RLC entities to which a PDCP PDU is submitted are different, an expression such as transmission paths different from each other may be used for discussion.

Figure 8:
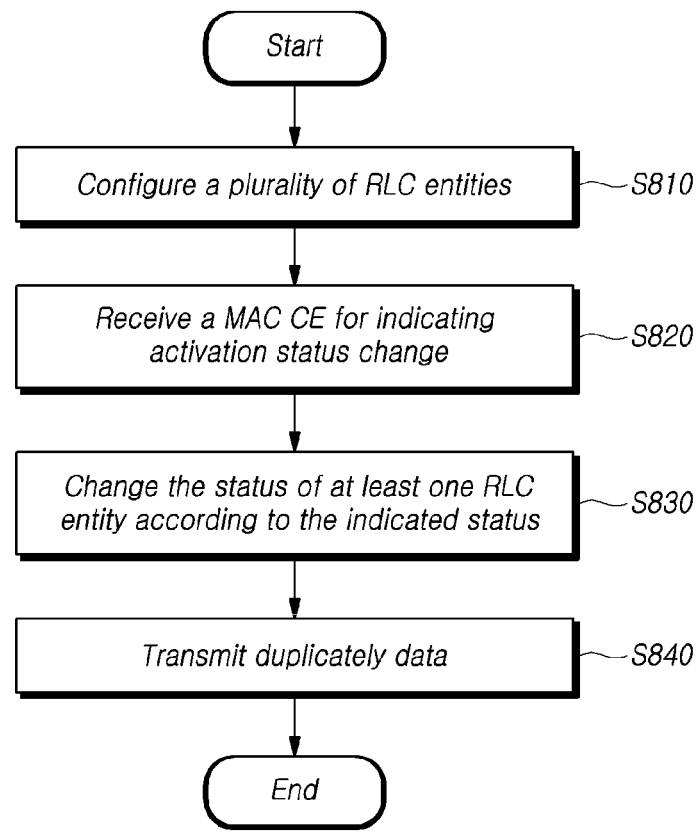
FIG. 8 is a flow diagram illustrating operation of a user equipment according to an embodiment of the present disclosure.

FIG. 8 is a flow diagram illustrating operation of a UE according to an embodiment of the present disclosure.

Referring to FIG. 8, in according to an embodiment of the present disclosure, a UE may configure a plurality of radio link control (RLC) entities used for processing duplicate transmission for a radio bearer with being associated with one packet data convergence protocol (PDCP) entity based on configuration information for configuring data duplicate transmission which is received from a base station, at step S810.

For example, the UE may receive the configuration information from the base station for configuring a data duplicate transmission function in the UE. The configuration information may include information required for configuring a plurality of RLC entities for processing duplicate transmission for a radio bearer. For example, the configuration information may include RLC index information assigned to each RLC entity for identifying the plurality of RLC entities. The RLC index information may be configured with RLC IDs as identification information for identifying each RLC entity. According to another embodiment, the configuration information may include information for indicating initial activation status for each of the plurality of RLC entities.

The UE configures the plurality of RLC entities based on the configuration information. When the information for indicating the initial activation status is included in the configuration information, each of the configured RLC entities is configured with activation or deactivation status that corresponds to a state indicated in the initial activation status.

Meanwhile, the plurality of RLC entities may include one primary RLC entity configured to transmit a PDCP control PDU of a radio bearer. The primary RLC entity is a specific RLC entity configured to transmit the PDCP control PDU, and when duplicate transmission is deactivated, a PDCP PDU including the PDCP control PDU may be transferred through the primary RLC entity. The primary RLC entity is a term used for merely convenience of description. Embodiments described herein are not limited to this specific term; therefore, it may be expressed as any other suitable terms.

In one embodiment, the primary RLC entity may be always set to activation status. For example, the primary RLC entity may be set to the activation status when the UE configures the plurality of RLC entities based on configuration information. Thereafter, the primary RLC entity is not transitioned to deactivation status. That is, even when the primary RLC entity is indicated by a MAC CE transmitted by a base station as deactivation status, the primary RLC entity may not be transitioned to the deactivation status. In another embodiment, even when the primary RLC entity is indicated by the MAC CE as deactivation status, the primary RLC entity may transmit a PDCP control PDU.

In another embodiment, the primary RLC entity may be set as an RLC entity that satisfies any one of the smallest cell group index value, the smallest logical channel ID, and the smallest RLC entity index value among activated RLC entities. That is, the primary RLC entity may be set as an RLC entity that satisfies a preset condition among RLC entities configured with activation status, rather than being set as a fixed specific RLC entity among a plurality of RLC entities. For example, among RLC entities configured with activation status, an RLC entity assigned with the smallest cell group index value by the configuration information or the MAC CE may be set as the primary RLC entity and transmit the PDCP control PDU. In another embodiment, among RLC entities configured with activation status, an RLC entity assigned with the smallest logical channel ID by the configuration information or the MAC CE may be set to the primary RLC entity and transmit the PDCP control PDU. In another embodiment, among RLC entities configured with activation status, an RLC entity assigned with the smallest RLC entity index value by the configuration information or the MAC CE may be set to the primary RLC entity and transmit the PDCP control PDU. In addition, such a preset condition may be set by a base station or set in a UE in advance, and may be variously set to, for example, the smallest cell group index value, the smallest logical channel ID, or the smallest RLC entity index value. Embodiments described herein are not limited to these preset conditions.

The UE may receive a MAC control element (MAC CE) including indication information for indicating activation status change for the plurality of RLC entities, at step S820. For example, the UE receives the MAC CE including information for indicating activation or deactivation for each of the plurality of RLC entities from the base station. The MAC CE may be received after the plurality of RLC entities are configured in the UE.

For example, the MAC CE may include indication information in the form of a bitmap which indicates activation status (e.g., activation or deactivation) of each of a plurality of RLC entities associated with each radio bearer. Here, the bitmap may be configured with only a bitmap for at least one remaining RLC entity except for one primary RLC entity configured to transmit a PDCP control PDU of a radio bearer among the plurality of RLC entities.

Figure 9:
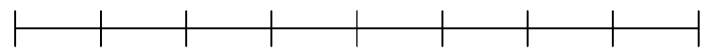
FIG. 9 illustrates a MAC CE including indication information according to an embodiment of the present disclosure.

FIG. 9 illustrates a MAC CE including indication information according to an embodiment of the present disclosure.

Referring to FIG. 9, when four RLC entities are configured for each radio bearer, an MAC CE may include indication information for indicating activation status of RLC entities for a total of eight radio bearers. For example, bits represented as R0X may denote RLC entity activation indication information for radio bearer 0. That is, R00 includes bit information for indicating whether an RLC entity to which RLC entity index 0 of radio bearer 0 is assigned is activated. If a value of R00 is indicated as 0, this denotes that the RLC entity to which RLC entity index 0 of radio bearer 0 is assigned is indicated as deactivation status. Likewise, if a value of R00 is indicated as 1, this denotes that the RLC entity to which RLC entity index 0 of radio bearer 0 is assigned is indicated as activation status. The activation or deactivation status according to a value of bits may be set to the reverse of the above examples. That is, a R00 value of 0 may indicate the activation status and a R00 value of 1 may indicate the deactivation status. As another example, the indication of the value of R00 as 0 may denote that the current activation status cannot be transitioned, and the indication of the value of R00 as 1 may denote that the current activation status can be transitioned to another status. Such a principle may be likewise applied to a reverse situation.

In another example, the last 0 in R00 may not an index of an RLC entity and denote an order in ascending/descending order of index values. That is, when 4 RLC entities configured for radio bearer 0, R01 may not indicate RLC entity index 1 and may indicate a second RLC entity in ascending/descending order of index values except for a primary RLC entity. For example, when RLC entity indexes are assigned as 0, 1, 2, and 3, and a primary RLC entity is set to index 0, R00, R01, and R02 may indicate RLC entity index 1, RLC entity index 2, and RLC entity index 3, respectively.

Accordingly, bitmap information configured in a corresponding MAC CE may be configured with only bits for indicating activation status of at least one RLC entity except for the primary RLC entity that is always configured with the activation status. Specifically, when 4 RLC entities are configured for each of 8 radio bearers, as one RLC entity is set to a primary RLC entity, it is therefore possible to indicate activation status of the remaining 3 RLC entities using 3 values of possible values in predetermined bits such as 2 bits or 3 bits for each radio bearer.

The UE may change one or more RLC entities indicated as activation status based on the indication information to the activation status, at step S830. When the indication information for indicating activation status (e.g., activation or deactivation) for each RLC entity by the MAC CE is received, based on this, the UE can change the status of each RLC entity to the corresponding activation or deactivation status. When the RLC entities are changed to the activation or deactivation status, as duplicate transmission data are transferred through an RLC entity in the activation status, therefore, associated transmission paths are changed.

The UE may duplicately transmit data using one or more activated RLC entities, at step S840. For example, when four RLC entities are configured, as two RLC entities are activated through a MAC CE, thus, data is duplicately transmitted through two transmission paths. Thereafter, when all four RLC entities by the MAC CE are changed to the activation status, as duplicate transmission data are transmitted through the four RLC entities, transmission paths may be extended. Likewise, while duplicate transmission is performed through RLC entity indexes 1 and 2, when RLC entity indexes 0 and 3 are activated and the RLC entity indexes 1 and 2 are deactivated through the MAC CE, transmission paths may be changed as the RLC entity indexes 0 and 3.

In this manner, when a plurality of RLC entities is configured and duplicate transmission function is available in a UE, a base station can dynamically control transmission paths.

Figure 10:
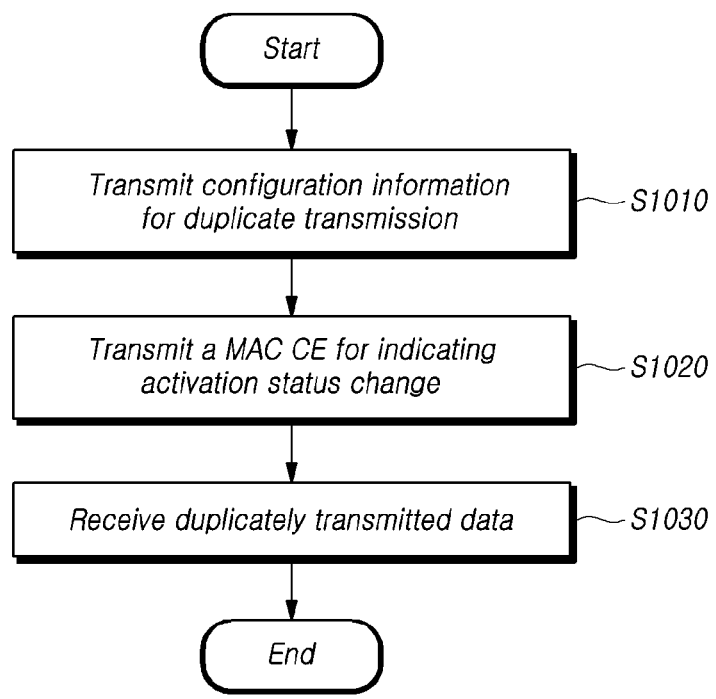
FIG. 10 illustrates operation of a base station according to an embodiment of the present disclosure.

FIG. 10 illustrates operation of a base station according to an embodiment of the present disclosure.

Referring to FIG. 10, a base station may transmit, to a UE, configuration information for configuring, in the UE, a plurality of radio link control (RLC) entities used for processing duplicate transmission for a radio bearer with being associated with one packet data convergence protocol (PDCP) entity, at step S1010.

The configuration information may include information required for configuring a plurality of RLC entities for processing duplicate transmission for a radio bearer. For example, the configuration information may include RLC index information assigned to each RLC entity for identifying the plurality of RLC entities. The RLC index information may be configured with RLC IDs as identification information for identifying each RLC entity. In another embodiment, the configuration information may include information for indicating initial activation status for each of the plurality of RLC entities.

The UE configures the plurality of RLC entities based on the configuration information. When the information for indicating the initial activation status is included in the configuration information, each of the configured RLC entities is configured with activation or deactivation status that corresponds to a state indicated in the initial activation status.

Meanwhile, the plurality of RLC entities may include one primary RLC entity configured to transmit a PDCP control PDU of a radio bearer.

In one embodiment, the primary RLC entity may be always set to activation status. For example, the primary RLC entity may be set to the activation status when the UE configures the plurality of RLC entities based on configuration information. Thereafter, the primary RLC entity is not transitioned to deactivation status. That is, even when the primary RLC entity is indicated by a MAC CE transmitted by a base station as deactivation status, the primary RLC entity may not be transitioned to the deactivation status. In another embodiment, even when the primary RLC entity is indicated by the MAC CE as deactivation status, the primary RLC entity may transmit a PDCP control PDU.

In another embodiment, the primary RLC entity may be set as an RLC entity that satisfies any one of the smallest cell group index value, the smallest logical channel ID, and the smallest RLC entity index value among activated RLC entities. That is, the primary RLC entity may be set as an RLC entity that satisfies a preset condition among RLC entities configured with activation status, rather than being set as a fixed specific RLC entity among a plurality of RLC entities. In addition, such a preset condition may be set by a base station or set in a UE in advance, and may be variously set to, for example, the smallest cell group index value, the smallest logical channel ID, or the smallest RLC entity index value. Embodiments described herein are not limited to these preset conditions.

The base station may transmit indication information for indicating activation status change for the plurality of RLC entities to the UE, at step S1020.

For example, the MAC CE may include indication information in the form of a bitmap which indicates activation status (e.g., activation or deactivation) of each of a plurality of RLC entities associated with each radio bearer. Here, the bitmap may be configured with only a bitmap for at least one remaining RLC entity except for one primary RLC entity configured to transmit a PDCP control PDU of a radio bearer among the plurality of RLC entities. Meanwhile, the MAC CE may be transmitted after the plurality of RLC entities are configured in the UE.

Specifically, when four RLC entities are configured for each of eight radio bearers, as one RLC entity is set to a primary RLC entity, it is therefore possible to indicate activation status (e.g., activation or deactivation) of the remaining three RLC entities using three values of possible values in predetermined bits such as two bits or three bits for each radio bearer.

The base station may receive data duplicately transmitted through RLC entities activated based on the indication information, at step S1030. When the indication information for indicating activation status (e.g., activation or deactivation) for each RLC entity by the MAC CE is received, based on this, the UE may change the status of each RLC entity to the corresponding activation or deactivation status. For example, when four RLC entities are configured, as two RLC entities are activated through a MAC CE, thus, data may be duplicately received through two transmission paths. Thereafter, when all four RLC entities by the MAC CE are changed to the activation status, duplicate transmission data may be received through the four RLC entities.

In this manner, when a plurality of RLC entities is configured and duplicate transmission function is available in a UE, a base station is able to dynamically control transmission paths.

Hereinafter, further various embodiments performed by the UE and the base station will be discussed. The embodiments described above and embodiments described below may be implemented, either separately or in any combinations. In addition, hereinafter, for convenience of description, when needed, activation or deactivation of an RLC entity may be expressed as "activation" or "deactivation", from a duplicate transmission path perspective.

Embodiment 1: A Method of Indicating the Activation or Deactivation of Duplicate Transmission Paths Through RRC Signaling A base station may transmit information (one bit) for indicating activation/deactivation for each transmission path for duplicate transmission to a UE. For example, when the base station configures, in the UE, two or more independent transmission paths (e.g., RLC entities) for a specific radio bearer through an RRC message, information (e.g., BOOLEAN, True: activation, False: deactivation) for indicating activation/deactivation for each transmission path may be additionally included in the configuration of the independent transmission paths. That is, information for indicating activation/deactivation for each RLC entity may be included in the configuration information transmitted from the base station to the UE.

In one embodiment, when information (pdcp-Duplication) for indicating an initial state of duplicate transmission for a radio bearer is set to activation, and information for indicating the initial state of duplicate transmission for transmission paths configured for the radio bearer is set to activation, the duplicate transmission through the transmission paths set to the activation for the radio bearer is activated. That is, when duplicate transmission for a specific radio bearer is activated, the duplicate transmission may be performed through the activated transmission paths. Information for activating transmission paths may be information for indicating transmission paths to be used for duplicate transmission, by a UE that receives an RRC message, to the radio bearer to which the duplicate transmission is activated. When the information (e.g., pdcp-Duplication) for indicating the initial state of duplicate transmission for the radio bearer is set to activation, and the information for indicating the transmission paths for performing the duplicate transmission is set, the UE may perform data duplicate transmission operations through the duplicate transmission paths.

In another embodiment, when two or more duplicate transmission paths (e.g., two or more RLC entities) are configured for a radio bearer, and when information for indicating an initial state of duplicate transmission for transmission paths configured for the radio bearer is set to activation, without including information (e.g., pdcp-Duplication) for indicating an initial state of duplicate transmission, the duplicate transmission through the transmission paths set to the activation for the radio bearer may be activated. Information for activating transmission paths may be information for indicating transmission paths to be used for duplicate transmission, by a UE that receives an RRC message, to the radio bearer to which the duplicate transmission is activated. When the information (e.g., pdcp-Duplication) for indicating the initial state of duplicate transmission for the radio bearer is set to activation, and when the information for indicating the transmission paths for performing the duplicate transmission is set, the UE may perform data duplicate transmission operations through the duplicate transmission paths.

For convenience of description, discussions are given on cases that use four independent transmission paths through examples. Further, discussions are given on cases where duplicate transmission is configured through MCG with 0, SCG1 with 1, SCG2 with 2, and SCG3 with 3 as ID/index (e.g., CellGroupId) values for identifying a cell group. This is merely for convenience of description, embodiments described herein may be also applicable to cases that duplicately transmit data through two or more paths by combining the CA duplicate transmission and the DC/MC duplicate transmission.

A base station may configure, in a UE, four independent transmission paths for a specific radio bearer based on measurement reporting of cell/cells/cell group associated with transmission paths, characteristics (e.g. QoS parameters, for example, 5QI, QFI) for each flow/radio bearer, traffic types, cell load, an amount of transmission data, buffering-activated data, and the like. For example, the base station may activate only two independent transmission paths (MCG1, SCG1) based on such information and the like, and use such transmission paths for data duplicate transmission. In this instance, the base station may indicate, as True, activation/deactivation bits of respective corresponding transmission paths for each of MCG1 and SCG1, and indicate, as False, activation/deactivation bits of respective corresponding transmission paths for each of SCG3 and SCG4. As another example, the base station may indicate, as True, activation/deactivation bits of respective corresponding transmission paths for each of MCG1 and SCG1 for a specific radio bearer for performing duplicate transmission, and indicate, as False, activation/deactivation bits of respective corresponding transmission paths for each of SCG3 and SCG4.

It is desirable for transmission paths for providing duplicate transmission to be indicated by being associated with a PDCP entity performing the duplicate transmission for PDCP PDUs. As the PDCP entity can be established such that DRB identification information (drb-Identity) and PDCP configuration information (pdcp-Config) are associated through DRB addition information (DRB-ToAddMod) included in an RRC message, and when the PDCP entity has two or more transmission paths, can be indicated to a UE by including respective drb-Identity associated to each RLC bearer configuration information (RLC-BearerConfig), therefore, the PDCP entity of the UE may identify an associated transmission path through a logical channel identity associated with the drb-Identity. When information (e.g., one bit) for indicating activation/deactivation for each transmission path is added in an RRC message, this may be provided by adding a new information element in respective RLC bearer configuration information (RLC-BearerConfig) corresponding to each transmission path. In this manner, it is possible to indicate activation/deactivation for RLC entities associated with a radio bearer for performing PDCP duplicate transmission. Hereinafter, activation/deactivation indication of a transmission path for providing duplicate transmission is used as meaning equal to indicating activation/deactivation of a corresponding RLC entity.

1.1 A Method of Defining Index Fields for Indicating One or More Duplicate Transmission Paths.

When two or more independent transmission paths for a specific radio bearer through an RRC message are configured in a UE, index (ID) information for identifying the transmission paths (RLC entities) in a distinguishable manner may be included in the RRC message. In one embodiment, when duplicate transmission for a radio bearer is activated, through an information element indicated based on index information for duplicate transmission paths (RLC entities) configured for the radio bearer, duplicate transmission is activated through the transmission paths indicated for the radio bearer. The information element may be information for indicating transmission paths (RLC entities) for performing duplicate transmission, by a UE that receives the RRC message, to the radio bearer for which the duplicate transmission is activated. In another embodiment, the information element may be used for indicating/changing/switching duplicate transmission activation for a radio bearer through MAC CE signaling described below.

When a base station desires two or more duplicate transmission paths to be configured in a UE, various combinations of duplicate transmission paths may be provided according to network deployments. For example, when three duplicate transmission paths are configured in a UE, the following configurations are available.

Firstly, three duplicate transmission paths may be configured in one cell group (MCG or master node) based on CA. Secondly, based on CA, two duplicate transmission paths may be configured in one cell group (MCG or master node), and one duplicate transmission path may be configured in another cell group (SCG 1 or secondary node 1). Thirdly, one duplicate transmission path may be configured in one cell group (MCG or master node), and two duplicate transmission paths may be configured in another cell group (SCG 1 or secondary node 1) based on CA. Fourthly, one duplicate transmission path may be configured in one cell group (MCG or master node), one duplicate transmission path may be configured in another cell group (SCG 1 or secondary node 1), and one duplicate transmission path may be configured in further another cell group (SCG 2 or secondary node 2).

In order to avoid complexity due to availability of various combinations in this manner, when a base station desires two or more duplicate transmission paths to be configured in a UE, it may be desirable for the base station to allow the UE to easily identify and use available transmission paths. To do this, it may be needed to define duplicate transmission path (RLC entity) index (ID) information for identifying duplicate transmission paths. In this instance, additionally defining the index information may enable easily identify respective transmission paths to be applied when activating duplicate transmission through a MAC CE. According to the typical RRC specification, corresponding duplicate transmission paths (e.g., RLC entities) may be identified a logical channel identifier (LCID). However, the logical channel identifier has a large number of bits. Further, when duplicate transmission is performed through one or more cell groups, the logical channel identifier is needed to be used by combining with a cell group identifier; there are therefore disadvantages to more increase the number of bits. Accordingly, separate index information for identifying duplicate transmission paths (RLC entities) in a distinguishable manner may be assigned as in embodiments described herein.

In one embodiment, the index information may be included in RLC bearer configuration information (e.g., RLC-BearerConfig) by being added as one information element thereto. In this manner, RLC entities associated with a radio bearer for performing PDCP duplicate transmission may be easily identified. In another embodiment, the index information may be included by being added as one information element associated with cell group identification information and logical channel identification information. The RLC bearer configuration information (e.g., RLC-BearerConfig) included in the cell group configuration information (e.g., CellGroupConfig) may distinguish between RLC entities through logical channel identification information that is a lower information element, in order for respective logical channels carrying duplicate data not to be transmitted over the same carrier, what is needed is to restrict logical channel mapping by including a serving cell (e.g., allowedServingCells) information element allowed in logical channel configuration information (e.g., LogicalChannelConfig). Accordingly, transmission path (e.g., RLC entity) indexes associated with the cell group identification information included in the cell group configuration information and the logical channel identification information included in the RLC bearer configuration information may lead to RLC entities to be activated/deactivated for duplicate transmission being easily identified.

In another embodiment, when only duplicate transmission based on a cell group (e.g., DC: Dual Connectivity or MC: Multi Connectivity) is configured, index information may be included in the cell group information by being included as one information element. In another embodiment, as index information is included in PDCP configuration information, information (e.g., pdcp-Duplication) for indicating an initial state of duplicate transmission for a corresponding radio bearer is set to activation, and when transmission paths (e.g., RLC entities) for performing corresponding duplicate transmission are included, duplicate transmission may be performed through the duplicate transmission paths.

In another embodiment, when duplicate transmission based on a cell group (e.g., DC or MC) is configured, coordination may be needed to effectively determine the number of duplicate transmission paths (e.g., RLC entities) between different base stations. For example, when it is assumed that up to four duplicate transmission paths (e.g., RLC entities) are configured, in the case of the DC, a master node and a secondary node are required to determine duplicate transmission paths for a specific radio bearer.

For example, it is possible for the master node to determine the number of transmission paths (e.g., RLC entities) to be activated for performing duplicate transmission through different nodes. The master node may determine all of the number of transmission paths (e.g., RLC entities) to be activated for the duplicate transmission in the master node or the secondary node. The master node may transfer, to the secondary node, information on one or more RLC entities to be activated for the duplicate transmission in the secondary node and/or information on the number of RLC entities to be activated for the duplicate transmission in the secondary node. For example, the information on the number of RLC entities to be activated may be transferred through an SN addition message or an SN modification message. The information on the number of RLC entities to be activated may be included as an information element in an XnAP message, or be included in a CG-ConfigInfo message that is an Inter-node RRC message included as a container in the XnAP message. In another embodiment, the information on the number of RLC entities to be activated may be included in an Inter-node RRC message. The secondary node may transfer configuration information on one or more RLC entities to be activated for duplicate transmission in the secondary node using the information on the number of RLC entities to be activated and/or information on the number of RLC entities to be activated for the duplicate transmission in the secondary node to the master node, and the master node can transfer this to the UE, in order for the duplicate transmission to be performed. In this instance, index information for identifying the duplicate transmission paths (e.g., RLC entities) may be included in the above message between nodes (e.g. an inter-node RRC message/XnAP message transferred from the master node to the secondary node and/or an inter-node RRC message/XnAP message transferred from the secondary node to the master node). The index information is information that may uniquely identify the duplicate transmission paths (e.g., RLC entities) in the UE. Thus, respective transmission paths (e.g., RLC entities) of the master node and the secondary node may not have the same transmission path (e.g., RLC entity) index. A range of index information and index information values may be shared between the master node and the secondary node through cell groups.

In another embodiment, the master node may determine only one or more RLC entities to be activated for duplicate transmission in the master node. The master node may transfer, to the secondary node, information on one or more RLC entities to be activated for duplicate transmission in master node configuration information and/or information on the number of RLC entities to be activated (available) for duplicate transmission in master node configuration information. The master node may transfer, to the secondary node, information on a maximum number of RLC entities that may be activated (the number of RLC entities that can be available)/the number of RLC entities that is requested/a minimum number of RLC entities that is requested, for the duplicate transmission in the secondary node. For example, the master node may transfer the information to the secondary node through an SN addition message or an SN modification message. The information may be included as an information element in a corresponding XnAP message, or be included in a CG-ConfigInfo message that is an Inter-node RRC message included as a container in the XnAP message. In another embodiment, the information may be included in an Inter-node RRC message. The secondary node may determine RLC entities to be activated for duplicate transmission in the secondary node using the information, and transfer, to the master node, configuration information of RLC entities to be activated and/or information on the number of RLC entities to be activated, for the duplicate transmission in the secondary node, and the master node may transfer this to the UE, in order for the duplicate transmission to be performed. In this instance, index information for identifying the duplicate transmission paths (e.g., RLC entities) may be included in the above message between nodes (e.g. an inter-node RRC message/XnAP message transferred from the master node to the secondary node and/or an inter-node RRC message/XnAP message transferred from the secondary node to the master node). The index information may be set as values for uniquely identifying the duplicate transmission paths (e.g., RLC entities) in the UE. Thus, respective transmission paths (e.g., RLC entities) of the master node and the secondary node cannot have the same transmission path (e.g., RLC entity) index. A range of index information and index information values may be shared between the master node and the secondary node through cell groups. If the master node and/or the secondary node are divided into a central unit (CU) and a distribute unit (DU), index information may be included in a F1AP message.

1.2 a Method of Configuring by Adding Information for Indicating One or More Duplicate Transmission Paths to be Activated (as Default) when Activating Duplicate Transmission for a Radio Bearer As described above, whether duplicate transmission for a radio bearer is activated through an RRC message may be provided through information (e.g., pdcp-Duplication) for indicating an initial state of the duplicate transmission for the radio bearer. If two or more independent transmission paths for a specific radio bearer is configured in a UE through an RRC message, it may be needed to instruct duplicate transmission transfer path information for transferring by activating duplicate transmission for PDCP PDUs to an PDCP entity executing duplicate transmission for the PDCP PDUs.

For example, when two or more RLC entities for the radio bearer are configured, a priority transmission path for transmitting PDCP data (PDCP data PDU or PDCP control PDU) which is always activated may be indicated. For convenience of description, when two or more RLC entities for duplicate transmission for one radio bearer are configured, a path for transmitting a PDCP data PDU or a PDCP control PDU which is always activated may be indicated as the priority transmission path. This is merely for convenience of description; this term may be replaced by any other similar terms. For example, the priority transmission path may become a primary transmission path. A primary transmission path in the dual connectivity technology may denote a path for transmitting data when an amount of uplink data to be transmitted by a UE is relatively small. For example, when a PDCP data volume to be transmitted by a UE is smaller than a threshold value, corresponding PDCP PDUs may be transferred through only a primary transmission path by indicated a base station. When a PDCP data volume to be transmitted by a UE is greater than a threshold value, transmission rates may be increased by transmitting the PDCP PDUs using any of two paths (e.g., master cell group (MCG), secondary cell group (SCG) of a split bearer). In another embodiment, as the duplicate transmission technology is introduced in NR Rel-15, the primary transmission path may be referred to as a path for transmitting a PDCP control PDU. In addition, in terms of an RLC entity, the priority transmission path may be expressed as the primary RLC entity as described above for discussions.

Accordingly, the priority transmission path may be discerned through one or more of an RLC entity that is always activated and transmit PDCP data (e.g., PDCP data PDU or PDCP control PDU) regardless of the activation of duplicate transmission for a radio bearer, a cell group to which the RLC entity belongs, and an allowed serving cell (e.g., allowedServingCells) information element associated with the RLC entity. Data required to be transmitted without being duplicated, such as a PDCP control PDU, may be transmitted through the priority transmission path. Duplicability of the PDCP control PDU cannot be discerned by a receiving entity because it does not have a sequence number (SN) field. Thus, when the PDCP control PDU is duplicately transmitted, since there is a probability of confusion as to whether such a duplicate function is applied, therefore, duplicate transmission may not be allowed in this case. Accordingly, the PDCP control PDU may be transmitted through an RLC entity associated with a priority transmission path or one RLC entity.

In another embodiment, duplicate transmission even for the PDCP control may be allowed. It is therefore possible to provide higher reliability by providing the duplicate transmission even for the PDCP control PDU. However, the PDCP Control PDU does not have an SN field. Accordingly, in order to perform duplicate transmission, it may be necessary to additionally define a field for identifying that a corresponding PDCP control PDU is a duplicated PDCP control PDU. In one embodiment, an SN field may be included in a PDCP control PDU format, or values that increase from 0 to a maximum value of −1 and cycle from the maximum value to 0 in the same manner as numbers in order using one or more of 4 R-fields included in the typical PDCP Control PDU format may be dedicated and used.

In another embodiment, for duplicate transmission of the PDCP Control PDU, it may be necessary to change the typical PDCP data volume calculation method for an uplink buffer status report. For example, for a UE to which two or more (e.g., up to four) duplicate transmissions are allowed, for a UE to which duplicate transmission for the PDCP control PDU is allowed, when the duplicate transmission is activated, the UE (e.g., transmission PDCP entity) may indicate a PDCP data volume to a MAC entity associated with all activated RLC entities. In another embodiment, when an RLC entity for a PDCP control PDU transmission is indicated/configured in a UE (or the RLC entity for the PDCP control PDU transmission is implicitly selected by the UE or the RLC entity for the PDCP control PDU transmission is arbitrarily selected by the UE), the UE (e.g., transmission PDCP entity) may indicate a PDCP data volume to a MAC entity associated with the RLC entity. The UE (e.g., transmission PDCP entity) may indicate a PDCP data volume except for the PDCP control PDU to a MAC entity associated with one or more remaining (or activated) RLC entities. In another embodiment, when a primary RLC entity for a PDCP control PDU transmission is indicated/configured in a UE (or the primary RLC entity is implicitly selected by the UE or the primary RLC entity is arbitrarily selected by the UE), the UE (e.g., transmission PDCP entity) may indicate a PDCP data volume to a MAC entity associated with the primary RLC entity. The UE (e.g., transmission PDCP entity) may indicate a PDCP data volume except for the PDCP control PDU to a MAC entity associated with one or more activated secondary RLC entities.

Meanwhile, when two or more RLC entities are configured for a radio bearer, two priority transmission paths (e.g., a primary path and a primary secondary path) for duplicately transmitting PDCP data by being activated may be indicated. For example, when four transmission paths are configured for duplicate transmission, by indicating two priority transmission paths considering radio quality and having low cell load, duplicate transmission may be performed through the corresponding two paths.

Meanwhile, when it is desired to indicate activation/deactivation for each transmission path, a field for indicating activation/deactivation for each transmission path is needed to be configured with the number of bits corresponding to the number of transmission paths. On the other hand, when transmission paths for performing duplicate transmission (e.g., a primary secondary path or an priority path for duplicate transmission of secondary paths) as default or in an initial state or with higher priority in addition to a priority transmission path (e.g., a primary path) are dedicated, the number of bits may be reduced. For example, the number of bits may be reduced to a value of the log function with the base of 2. Specifically, when 4 paths are configured, one or more transmission paths for performing duplicate transmission as default or in an initial state or with higher priority among the 4 paths through 2 bits (00, 01, 10, 11) may be dedicated.

In one embodiment, in a situation where information (e.g., pdcp-Duplication) that indicates an initial state of duplicate transmission for a radio bearer is set to the activation, when duplicate transmission paths to be activated as default/in an initial state/with higher priority are included in addition to a priority transmission path, the duplicate transmission through the corresponding transmission paths for the radio bearer may be activated.

Figure 11:
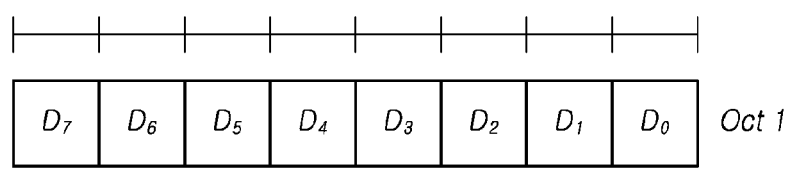
FIG. 11 illustrates a MAC CE for indicating a duplicate transmission according to another embodiment of the present disclosure.

In another embodiment, as shown in FIG. 11, when a duplicate activation indication for a specific radio bearer is received through a typical duplicate activation/deactivation MAC CE, when duplicate transmission paths to be activated as default/in an initial state/with higher priority are configured in addition to a priority transmission path for the radio bearer, a UE performs the duplicate transmission as the duplicate transmission through the corresponding transmission paths for the radio bearer is activated through the duplicate transmission paths to be activated as default/in an initial state/with higher priority for the radio bearer.

In another embodiment, it is necessary to indicate transmission paths for providing duplicate transmission in terms of a PDCP entity performing the duplicate transmission for PDCP PDUs. When two or more independent transmission paths for a specific radio bearer through an RRC message are configured in a UE, a priority transmission path or at least one duplicate transmission path to be activated as default/in an initial state/with higher priority may be indicated by being included in PDCP configuration information of a PDCP entity. The at least one duplicate transmission path to be activated as default/in an initial state/with higher priority may be indicated to the PDCP entity through one or more of cell group identification information, logicalChannelIdentity and an allowed serving cell (allowedServingCells) associated with a RLC entity.

In another embodiment, a priority transmission path or at least one transmission path to be activated as default/in an initial state/with higher priority may be implicitly determined. In one embodiment, a cell/cell group (in the case of the cell, PCell is excluded, and in the case of the cell group, MCG is excluded) having an index (e.g., CellGroupId) for identifying a cell/cell group of a lowest index may become the priority transmission path. In another embodiment, a cell/cell group (in the case of the cell, PCell is excluded, and in the case of the cell group, MCG is excluded) having an ID/index (e.g., CellGroupId) for identifying a cell/cell group of a lowest index except for a priority transmission path (e.g., primary path) may become the at least one transmission path to be activated as default/in an initial state/with higher priority. In another embodiment, a transmission path having a lowest transmission path (an RLC entity) index may become the priority transmission path. In another embodiment, a transmission path having a lowest transmission path (an RLC entity) index except for a priority transmission path (e.g., primary path) may become the transmission path to be activated as default/in an initial state/with higher priority. In another embodiment, if present, a last activated cell/cell group (in the case of the cell, except for PCell, and in the case of the cell group, except for MCG) may become the priority transmission path or the transmission path to be activated as default/in an initial state/with higher priority. In another embodiment, a transmission path assigned with a logical channel identifier (except for a logical channel identifier mapped to a SRB) having a lowest index that can be mapped for a radio bearer may become the priority transmission path. In another embodiment, a transmission path assigned with a logical channel identifier (except for a logical channel identifier mapped to a SRB) having a lowest index that can be mapped for a radio bearer except for the priority transmission path may become the transmission path to be activated as default/in an initial state/with higher priority. In another embodiment, if present, a transmission path assigned with a last activated logical channel identifier may become the priority transmission path or the transmission path to be activated as default/in an initial state/with higher priority.

In another embodiment, in a situation where two or more independent transmission paths for a radio bearer through an RRC message are configured in a UE, when the UE receives a duplicate activation/deactivation MAC CE of FIG. 11 having a value of LCID 111000, the UE may select duplicate transmission paths of the radio bearer for which duplicate transmission is activated through the priority transmission path or the transmission path to be activated as default/in an initial state/with higher priority by way of embodiments related to Embodiment 1.

Embodiment 2: A Method of Indicating One or More Duplicate Transmission Paths for Performing Duplicate Transmission for a Radio Bearer for which Duplicate Transmission is Activated Through a MAC CE When two or more independent transmission paths for a radio bearer through an RRC message is configured in a UE, a base station may indicate activation/deactivation for the duplicate transmission to the UE through a MAC CE. The base station may transmit information for indicating the duplicate transmission paths (e.g., RLC entities) the radio bearer for activating the duplicate transmission through the MAC CE. That is, the base station may transmit at least one of information for indicating the activation of the duplicate transmission for the radio bearer and information for indicating the duplicate transmission paths to the UE through the MAC CE.

For example, when two or more independent transmission paths for a specific radio bearer through an RRC message is configured in a UE, the MAC CE indicated by the base station to the UE may include an activation status (e.g. information of one bit for indicating activation/deactivation (True: the activation, False: the deactivation)) of a transmission path for each transmission path, information of one bit for indicating whether a transmission path is used as a secondary path for duplicate transmission (True: the duplicate transmission is performed through the transmission path, False: the duplicate transmission is not performed through the transmission path), or information of 1 bit for indicating whether an RLC entity included in a transmission path is activated for duplicate transmission (True: the RLC entity is activated, False: the RLC entity is not activated). Such information for all duplicate transmission paths (or RLC entities) included in the MAC CE may be included as bitmap information.

In one embodiment, in the MAC CE, each of a priority transmission path (a primary RLC entity to be activated) and one or more duplicate transmission paths (one or more secondary RLC entities to be activated) for each radio bearer may be set to True (1), and one or more remaining transmission paths (one or more secondary RLC entities to be deactivated) may be set to False (0). In another embodiment, in the MAC CE, only one or more duplicate transmission paths (one or more secondary RLC entities to be activated) except for a priority transmission path (a primary RLC entity to be activated) for each radio bearer may be set to True (1), and one or more remaining transmission paths (one or more secondary RLC entities to be deactivated) and the priority transmission path (the primary RLC entity to be activated) may be set to False (0). In another embodiment, in the MAC CE, bits for a priority transmission path (a primary RLC entity to be activated) for each radio bearer may not be included, and only one or more duplicate transmission paths (one or more secondary RLC entities to be activated) except for the priority transmission path (the primary RLC entity to be activated) for each radio bearer may be set to True (1), and one or more remaining transmission paths (one or more secondary RLC entities to be deactivated) may be set to False (0). That is, bits indicating the activation of the priority transmission path may be excluded from the bitmap information.

2.1 a Method of Indicating by Defining a New MAC CE Including an Information Field for Indicating One or More Transmission Paths for Performing Duplicate Transmission.

FIG. 11 illustrates a MAC CE for indicating a duplicate transmission according to another embodiment of the present disclosure.

Referring to FIG. 11, a duplicate activation/deactivation MAC CE may be identified by a MAC PDU subheader having a value of LCID 111000. This is configured with one octet including eight D fields. Here, the D field is defined as follow.

Di: This field indicates the activation/deactivation status of the PDCP duplication of DRB i. Here, i is the ascending order of the DRB ID among the DRBs configured with PDCP duplication and with RLC entity(ies) associated with this MAC entity. The Di field is set to one to indicate that the PDCP duplication of DRB i shall be activated. This field indicates the activation/deactivation status of the PDCP duplication of DRB i where i is the ascending order of the DRB ID among the DRBs configured with PDCP duplication and with RLC entity(ies) associated with this MAC entity. The Di field is set to one to indicate that the PDCP duplication of DRB i shall be activated. The Di field is set to zero to indicate that the PDCP duplication of DRB i shall be deactivated.

However, the MAC CE as shown in FIG. 11 indicates only the activation or deactivation of the duplicate transmission function for a specific radio bearer, and does not indicate the activation or deactivation of each duplicate transmission path. Accordingly, a base station may indicate, to a UE, one or more duplicate transmission activation/deactivation transmission paths for each radio bearer through a new MAC CE separated from the duplicate activation/deactivation MAC CE of FIG. 11 having a value of LCID 111000.

FIG. 12 illustrates a MAC CE for indicating duplicate transmission paths according to an embodiment of the present disclosure.

Referring to FIG. 12, for example, a new MAC CE may include eight D fields included in the duplicate transmission activation/deactivation MAC CE. As a result of this, the activation/deactivation status of the PDCP duplication of DRB i may be indicated in ascending order of DRB IDs among DRBs configured with PDCP duplication. In another embodiment, the eight D fields may not be included in the new MAC CE, and one or more fields for indicating one or more duplicate transmission paths may be included in the new MAC CE as described below. As a result of this, by defining the MAC CE having a fixed length without including the D fields, activation/deactivation transmission paths (e.g., RLC entities) for each radio bearer may be indicated in the ascending order, while the number of bits may be efficiently used.

In another embodiment, the new MAC CE may indicate one or more duplicate transmission paths for the PDCP duplication of DRB i in ascending order of DRB IDs among DRBs configured with PDCP duplication. As a result of this, one or more activated transmission paths for performing duplicate transmission for each radio bearer may be indicated. In one embodiment, the duplicate transmission path may indicate a transmission path (RLC entity) over which the duplicate transmission is provided in addition to a priority transmission path when the PDCP duplicate transmission of a corresponding radio bearer for DRBs configured with PDCP duplication is activated. One or more duplicate transmission paths for each radio bearer may be indicated through a duplicate transmission logical channel ID of a duplicate transmission RLC entity associated with a PDCP entity of a corresponding radio bearer and/or a cell group ID to which the duplicate transmission RLC entity and/or the duplicate transmission logical channel ID is belongs or an allowed serving cell (allowedServingCells). For example, in a situation where a base station configures two or more duplicate transmission paths in a UE, when a maximum number of cell groups is fixed to four (e.g., MCG, SCG1, SCG2, SCG3), as shown in FIG. 12, each cell group ID may be configured with two bits. Further, each logical channel ID fields may be provided with 6 bits.

2.2 A Method of Indicating One or More Duplicate Transmission Paths to be Activated/Deactivated for Each Radio Bearer.

FIG. 13 illustrates a MAC CE for indicating duplicate transmission paths according to further another embodiment of the present disclosure.

Referring to FIG. 13, for example, a new MAC CE may include eight D fields included in the typical duplicate activation/deactivation MAC CE. As a result of this, the activation/deactivation status of the PDCP duplication of DRB i may be indicated in ascending order of DRB IDs among DRBs configured with PDCP duplication. In another embodiment, the eight D fields may not be included in the new MAC CE, and only one or more fields for indicating one or more duplicate transmission paths as described below may be included in the new MAC CE. As a result of this, by defining the MAC CE having a fixed length without including the D fields, activation/deactivation transmission paths (e.g., RLC entities) for each radio bearer may be indicated in the ascending order, while the number of bits can be efficiently used.

In another embodiment, the new MAC CE may indicate one or more activation/deactivation duplicate transmission paths (one or more activation/deactivation RLC entities) for the PDCP duplication of DRB i in ascending order of DRB IDs among DRBs configured with PDCP duplication. As a result of this, one or more transmission paths (one or more RLC entities to be activated) for performing duplicate transmission for each radio bearer may be indicated. The duplicate transmission path may indicate one or more activation/deactivation duplicate transmission paths (one or more activation/deactivation RLC entities) over which the duplicate transmission is provided in addition to a priority transmission path when the PDCP duplicate of a corresponding radio bearer for DRBs configured with PDCP duplication is activated. The MAC CE may be configured with only bits for indicating the activation status of one or more duplicate transmission paths (one or more activation/deactivation RLC entities) over which the duplicate transmission is provided except for a priority transmission path.

The duplicate transmission path for each radio bearer may be identified by an index value for identifying a duplicate transmission path (e.g., an RLE entity) for a corresponding radio bearer. This may be associated with an index value associated with a duplicate transmission logical channel ID of a duplicate transmission RLC entity associated with a PDCP entity of the radio bearer and/or a cell group ID to which the duplicate transmission RLC entity and/or the duplicate transmission logical channel ID is belongs or an allowed serving cell (allowedServingCells). Each transmission path (e.g., RLC entity) can be identified through one or more of the cell group ID, the logical channel ID, and the allowed serving cell (allowedServingCells), and an index for the corresponding transmission path (e.g., RLC entity) may be indicated to a UE through a higher layer (an RRC message).

In one embodiment, in a situation where a base station configures two or more duplicate transmission paths in a UE, when a maximum number of duplicate transmission paths is configured up to four, each transmission path may be identified using four bits for duplicate transmission path fields, as shown in FIG. 13. The four bits may be used as bitmap information for indicating activation/deactivation transmission paths (RLC entities) for a corresponding radio bearer. In one embodiment, each bit may indicate the activation status (activation/deactivation) of a transmission path (RLC entity) in ascending order of transmission path (RLC entity) indexes that belong to a radio bearer or for each transmission path (RLC entity) index that belongs to the radio bearer.

In another embodiment, in a situation where deactivation for a priority transmission path (e.g., a primary path/primary RLC entity) is not allowed/supported, when a UE receives a priority transmission path (e.g., a primary path/primary RLC entity) set to the deactivation over a MAC CE, the UE may ignore this configuration. The priority transmission path (e.g., the primary path/primary RLC entity) may be always remained in the activated status while the radio bearer is configured.

In another embodiment, in a situation where deactivation for a priority transmission path (e.g., a primary path) is allowed/supported, when a UE receives a priority transmission path (e.g., a primary path/primary RLC entity) set to the deactivation, the UE may deactivate the priority transmission path (e.g., the primary RLC entity). The UE may select one of remaining transmissions (e.g., RLC entities) received with being set to the activation as a priority transmission path (e.g., a primary RLC entity). In one embodiment, the UE may determine a transmission path (RLC entity) having a lowest ID/index of remaining transmissions (RLC entities) received with being set to the activation as a priority transmission path (e.g., a primary RLC entity). In another embodiment, the UE may determine a priority transmission path (e.g., a primary RLC entity) based on a rule/threshold value/condition/reference/determination configured by an associated network/base station, among remaining transmissions (e.g., RLC entities) received with being set to the activation. In another embodiment, a base station may indicate, to a UE, information for indicating a priority transmission path (e.g., a primary RLC entity) among remaining transmissions (e.g., RLC entities) received with being set to the activation, by including in a MAC CE or through a separate signaling. In another embodiment, a UE may determine a transmission path (e.g., RLC entity) included in a MCG among remaining transmissions (e.g., RLC entities) received with being set to the activation as a priority transmission path (e.g., a primary RLC entity). The UE may transmit data to be transmitted without duplication such as the PDCP control PDU through the priority transmission path (e.g., the primary RLC entity). In another embodiment, a UE may select an RLC entity having the smallest (lowest) cell group index, the smallest (lowest) logical channel ID, or the smallest (lowest) RLC index value among remaining transmissions (RLC entities) received with being set to the activation as a priority transmission path (e.g., a primary RLC entity).

In another embodiment, in a situation where a base station configures two or more duplicate transmission paths in a UE, when a maximum number of duplicate transmission paths is configured up to four, respective allocation/deactivation transmission paths may be identified using three values of possible values in predetermined bits such as two bits or three bits for fields of the remaining transmission paths (RLC entities) except for a priority transmission path (primary RLC entity). In one embodiment, each bit may indicate the activation status (activation/deactivation) of a transmission path (e.g., RLC entity) in ascending order of transmission path (e.g., RLC entity) indexes that belong to a radio bearer except for the priority transmission path (e.g., primary RLC entity) or for each transmission path (e.g., RLC entity) index that belongs to the radio bearer.

In another embodiment, in a situation where a base station configures two or more duplicate transmission paths in a UE, when a maximum number of duplicate transmission paths is configured up to three, respective allocation/deactivation transmission paths may be identified using three values of possible values in predetermined bits such as two bits or three bits for each radio bearer for duplicate transmission path fields.

In another embodiment, in a situation where a base station configures two or more duplicate transmission paths in a UE, when a maximum number of duplicate transmission paths is configured up to three, respective allocation/deactivation transmission paths may be identified using two values of possible values in predetermined bits such as two bits or three bits for fields of the remaining transmission paths (e.g., RLC entities) except for a priority transmission path (e.g., primary RLC entity). In one embodiment, each bit may indicate the activation status (activation/deactivation) of a transmission path (e.g., RLC entity) in ascending order of transmission path (e.g., RLC entity) indexes that belong to a radio bearer except for the priority transmission path (e.g., primary RLC entity) or for each transmission path (e.g., RLC entity) index that belongs to the radio bearer.

In another embodiment, in a situation where a base station configures two or more duplicate transmission paths in a UE, when a maximum number of duplicate transmission paths is configured up to two, respective allocation/deactivation transmission paths may be identified using two values of possible values in predetermined bits such as two bits or three bits for each radio bearer for duplicate transmission path fields.

In another embodiment, in a situation where a base station configures two or more duplicate transmission paths in a UE, when a maximum number of duplicate transmission paths is configured up to two, an allocation/deactivation transmission path may be identified using one bit for a field of the remaining transmission path (e.g., RLC entity) except for a priority transmission path (e.g., primary RLC entity).

Hereinafter, in terms of the operation of a UE, embodiments related to the operation of the UE when the UE receives a MAC CE for indicating the above transmission path activation will be described.

In one embodiment, as described above, a UE is always activated and may transmit a PDCP data PDU or a PDCP control PDU through a priority transmission path. In one embodiment, when a priority transmission path for a radio bearer providing duplicate transmission is configured, a base station may configure the priority transmission path not to be indicated as being deactivated through the above MAC CE, and the UE may transmit the PDCP data PDU or the PDCP control PDU through the priority transmission path.

In another embodiment, as described above, the transmission of the PDCP control PDU through the priority transmission path is always activated, and the UE may transmit the PDCP control PDU through the priority transmission path. However, the base station may instruct the transmission of the PDCP data PDU to be deactivated for the priority transmission path in the same manner as the remaining duplicate transmission paths. As a result of this, although the transmission of the PDCP data PDU is transmitted through the priority transmission path that is always activated; for user data required to be transmitted with reliability, the base station can dynamically set a duplicate transmission path to the UE.

In another embodiment, a base station may dedicate a priority transmission path in an initial stage through RRC signaling. However, the base station may deactivate the priority transmission path through a MAC CE. When the priority transmission path is deactivated through the MAC CE, a UE may transmit a PDCP control PDU by selecting one of activated transmission paths.

In another embodiment, when two or more transmission paths for duplicate transmission for one radio bearer are configured, a priority transmission path may not be configured through RRC signaling. A UE may transmit a PDCP control PDU by selecting one of transmission paths that are instructed to be activated using one of methods of dedicating a priority transmission path described above. Thereafter, when a transmission path through which the PDCP control PDU is transmitted is deactivated through a MAC CE, the UE may transmit a PDCP control PDU again by selecting one of transmission paths that are instructed to be activated through the MAC CE using one of methods described above.

The dedication of a priority transmission path by a UE may be performed using one of the following methods.

In one embodiment, when a RLC entity that is transmitting a PDCP control PDU or a primary RLC entity that is configure to transmit a PDCP control PDU is deactivated, the primary RLC entity does not perform duplicate transmission for the PDCP data PDU for a corresponding radio bearer. However, when a PDCP control PDU is generated, the UE may transmit the PDCP control PDU through a deactivated primary RLC entity. In one embodiment, when a RLC entity that is transmitting a PDCP control PDU or a primary RLC entity that is configure to transmit a PDCP control PDU is deactivated, the primary RLC entity does not perform duplicate transmission for the PDCP data PDU for a corresponding radio bearer. Further, even when a PDCP control PDU is generated, a UE does not transmit the PDCP control PDU through a deactivated primary RLC entity. The PDCP control PDU may be transmitted through one RLC entity of activated RLC entities. The UE may select an RLC entity having the lowest index value of activated RLC entities for a PDCP control PDU transmission. In one embodiment, the UE may select an RLC entity having the lowest cell group index, the smallest logical channel ID, or the smallest RLC index value. In another embodiment, the UE may select one RLC entity of activated RLC entities.

In another embodiment, when a primary RLC entity is not configured, the UE may transmit the PDCP control PDU through one RLC entity of activated RLC entities. The UE may select an RLC entity having the lowest index value of activated RLC entities for a PDCP control PDU transmission. In one embodiment, the UE may select an RLC entity having the lowest cell group index, the smallest logical channel ID, or the smallest index value. In another embodiment, the UE can arbitrarily select one RLC entity.

2.3 a Method of Including Only One or More Duplicate Transmission Paths for a Duplicate Transmission Activation Radio Bearer in a MAC CE.

A duplicate transmission path field may be provided with an order (e.g., in ascending order) over a Di field for only a radio bearer for which the Di field is set to 1 (duplication is activated). That is, a MAC CE may have a variable length. The MAC CE is octet-aligned or byte-aligned. If there is an available bit(s) in the last octet, this bit(s) may be filled with a padding bit(s).

FIG. 14 illustrates a MAC CE for indicating duplicate transmission paths according to further another embodiment of the present disclosure.

FIG. 14 illustrates cases including only duplicate transmission paths for an activated radio bearer for the embodiment of section 2.2. For example, when duplicate transmission is activated for radio bearers D1, D2, D4, and D5, duplicate transmission paths may be included only for these radio bearers in ascending order. For convenience of description, although discussions are conducted based on the embodiment of section 2.2, it should be noted that configuring a MAC CE to include only a duplicate transmission path of an activated radio bearer for any embodiments described herein is included in the scope of embodiments described above.

2.4 A Method of Defining a New MAC CE by Fixing the Number of Duplicate Transmission Paths for Each Cell Group, and/or a Maximum Number of Cell Group Paths for Duplicate Transmission.

A base station may indicate, to a UE, one or more duplicate transmission activation/deactivation transmission paths for each radio bearer through a new MAC CE separated from the duplicate activation/deactivation MAC CE of FIG. 11 having a value of LCID 111000.

The new MAC CE may include eight D fields included in the typical duplicate transmission activation/deactivation MAC CE. As a result of this, duplicate/deactivation status of the PDCP duplication of DRB i may be indicated in ascending order of DRB IDs among DRBs configured with PDCP duplication. In another embodiment, the eight D fields may not be included in the new MAC CE, and only one or more fields for indicating one or more duplicate transmission paths as described below can be included in the new MAC CE. As a result of this, by defining the MAC CE having a fixed length without including the D fields, activation/deactivation transmission paths (e.g., RLC entities) for each radio bearer may be indicated in the ascending order, while the number of bits may be efficiently used.

The new MAC CE may indicate the activation status of one or more duplicate transmission paths for the PDCP duplication of DRB i in ascending order of DRB IDs among DRBs configured with PDCP duplication. As a result of this, one or more transmission paths for performing duplicate transmission for each radio bearer may be indicated. The duplicate transmission path may indicate a transmission path (e.g., RLC entity) over which the duplicate transmission is provided in addition to a priority transmission path when the PDCP duplicate transmission of the radio bearer for DRBs configured with PDCP duplication is activated. This may be configured with either information for each radio bearer or common information for a radio bearer for which duplicate transmission is activated. For example, when a MAC CE is configured with information for each radio bearer, one MAC CE may include activation status information of a duplicate transmission path (e.g., RLC entity) for one radio bearer. To do this, DRB identification information may be included in the MAC CE. In another embodiment, a new MAC CE may include cell group indexes in ascending order of radio bearer IDs or activation status information of transmission paths (RLC entities) in ascending order of logical channel IDs or RLC indexes, for all radio bearers. In even the embodiments described above, one or more duplicate transmission paths may be configured with either information for each radio bearer or common information for a radio bearer for which duplicate transmission is activated.

FIG. 15 illustrates a MAC CE for indicating a duplicate transmission according to further another embodiment of the present disclosure.

Referring to FIG. 15, a MAC CE is configured with common information for a radio bearer for which duplicate transmission is activated. When a base station configures two or more duplicate transmission paths in a UE, the base station and an associated UE may identify the duplicate transmission paths by fixing a maximum number of cell groups that may be configured in the UE and a maximum number of duplicate transmission paths for each cell group.

For example, when the maximum number of cell groups is fixed to 4, and the maximum number of duplicate transmission paths for each cell is fixed to 2, the UE may be configured with duplicate transmission paths of a maximum number of 8. Each fixed duplicate transmission path may be configured in a predetermined order. For example, when the duplicate transmission path is configured in ascending order of CG and in ascending order of LCID, the duplicate transmission path can be identified by being fixed with MCG0 low LCID, MCG0 high LCID, SCG1 low LCID, SCG1 high LCID, SCG2 low LCID, SCG2 high LCID, SCG3 low LCID, and SCG3 high LCID. The duplicate transmission path may be configured by assigning such an ascending order to a MAC CE as shown in FIG. 15. In this instance, only one or more duplicate transmission paths (one or more secondary RLC entities) except for a priority transmission path (a primary RLC entity) for each bit may be set to True (1), and one or more remaining transmission paths (one or more RLC entities) and the priority transmission path (the primary RLC entity) may be set to False (0). In another embodiment, a priority transmission path (e.g., a primary RLC entity) and one or more duplicate transmission paths (e.g., one or more RLC entities) except for the priority transmission path for each bit may be set to True (1), and one or more remaining transmission paths may be set to False (0).

In another embodiment, when a maximum number of cell groups is fixed to two, and a maximum number of duplicate transmission paths for each cell is fixed to two, the UE may be configured with duplicate transmission paths of a maximum number of four. Each fixed duplicate transmission path may be identified in a predetermined order. For example, when the duplicate transmission path is configured in ascending order of CG and in ascending order of LCID, the duplicate transmission path can be identified by (MCG low LCID)=RLC-ID 0, (MCG high LCID)=RLC-ID 1, (SCG low LCID)=RLC-ID 2, (SCG high LCID)=RLC-ID 3.

Embodiment 3: A Method of Indicating One or More Duplicate Transmission Paths for Performing Duplicate Transmission for a Radio Bearer for which Duplicate Transmission is Activated Through a PDCP Control PDU Hereinbefore, when two or more independent transmission paths for a radio bearer through an RRC message is configured in a UE, the methods of a base station for indicating, to the UE, one or more duplicate transmission paths for a radio bearer for which duplicate transmission is activated have been described. When duplicate transmission is activated for a radio bearer, the duplicate transmission may be performed as PDCP entity submits a PDCP data PDU to two RLC entities being duplicately associated. That is, the PDCP entity performs the duplicate transmission according to information indicated after the PDCP entity receives a duplicate transmission activation/deactivation MAC CE of a MAC entity. If two or more independent transmission paths for a radio bearer, a PDCP entity becomes a subject changing/switching the duplicate transmission paths. Accordingly, information for indicating a transmission path for duplicate transmission may be provided through a new PDCP control PDU.

In this instance, it is not needed for the MAC layer to transfer such indication to the PDCP layer. In addition, there is an advantage of enabling a PDCP control PDU to be applied for only a radio bearer for which that duplicate transmission is activated or to be activated. Thus, when indicating one or more duplicate transmission paths for performing duplicate transmission for a radio bearer for which the duplicate transmission is activated through the PDCP control PDU, the PDCP control PDU may include information or a field included in a MAC CE described in the embodiments described above. A PDU type value of the PDCP control PDU may use one of reserved 010-111 values.

Meanwhile, a PDCP PDU may be submitted to an RLC entity over a duplicate transmission path. The PDPD Control PDU may be transmitted through a priority transmission path (e.g., primary transmission path).

Hereinafter, a method of handling data remaining in an RLC entity that is previously activated when a duplicate transmission path is changed using one of methods described above will be described.

A Method of Handling Data Remaining in an RLC Entity Over a Duplicate Path that is Previously Activated.

In a situation where two or more independent transmission paths for a radio bearer through an RRC message is configured in a UE according to the embodiments described above, when a base station receives a change of a duplicate transmission path for a radio bearer for which duplicate transmission is activated, the UE may change the duplicate transmission path of the radio bearer for which the duplicate transmission is activated through an indicated duplicate transmission path. In this instance, when only duplicate transmission path is changed in a state where duplicate transmission has been previously activated for the radio bearer, there is a probability that data may remain over an RLC entity that has previously performed the duplicate transmission. Accordingly, in a situation where the data remains over the RLC entity, thereafter, when the RLC entity is reconfigured, there may occur a problem in handling the data. Therefore, in a situation where two or more independent transmission paths for a radio bearer through an RRC message is configured in a UE, when signaling for indicating a change of a duplicate transmission path for a radio bearer for which duplicate transmission has been already activated is received, the UE may change the duplicate transmission path to an indicated duplicate transmission path.

In this instance, the UE may handle data remaining in an RLC entity that is changed to the deactivation status through embodiments described below.

In one embodiment, the UE may reconfigure a radio bearer duplicate transmission RLC entity that has been previously activated.

In another embodiment, the UE may configure a corresponding previous RLC entity to continuously perform transmission. When the previous RLC entity identifies a pending PDCP PDU transmission, corresponding data (PDCP PDUs/RLC SDUs/RLC SDUs segments) in the RLC entity may be discarded. In this regard, when a primary RLC entity identifies the transmission of a pending PDCP PDU, a PDCP entity may instruct a previous RLC entity to discard the data, so that the previous RLC entity discards the data.

However, in a situation where the previous RLC entity continually performs transmission, when continually failing to perform retransmission in the previous RLC entity, there may be caused a radio link failure problem. Accordingly, as described above, it may be desirable to reconfigure a corresponding RLC entity. In another embodiment, even when continually failing to perform retransmission, a radio link failure may not be detected, or when a timer is set and is terminated, all pending data may be discarded. In another embodiment, by instructing a RLC entity over a duplicate transmission path that has been previously activated in a PDCP entity of a radio bearer to discard all duplicate PDCP PDUs/RLC SDUs/RLC SDUs segments that have not been handled, the RLC entity can be allowed to discard them.

As described above, according to a radio status change, by implementing the duplicate transmission function through a selective change of a duplicate transmission path, it is possible to provide an effect of implementing the duplicate transmission function, while effectively reducing overhead over radio systems.

Hereinafter, hardware configuration and operations of a UE and a base station capable of performing a part or all of the embodiments described above will be discussed again with reference to the drawings.

Figure 16:
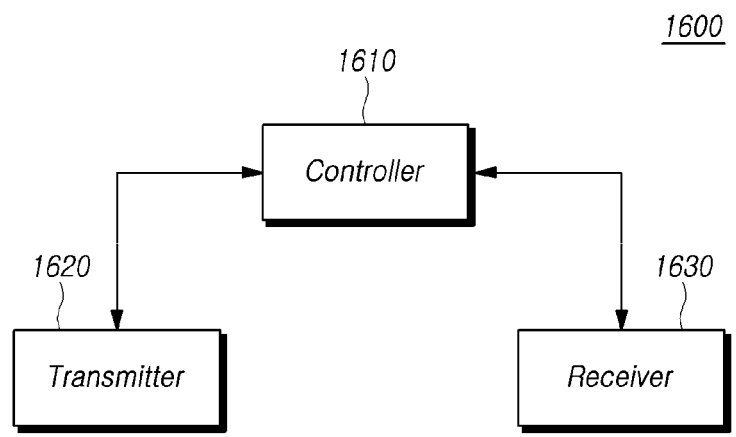
FIG. 16 is a block diagram illustrating a user equipment according to an embodiment of the present disclosure.

FIG. 16 is a block diagram illustrating a user equipment according to an embodiment of the present disclosure.

Referring to FIG. 16, a UE 1600 for transmitting data may include a controller 1610 for configuring a plurality of radio link control (RLC) entities used for processing duplicate transmission for a radio bearer with being associated with one packet data convergence protocol (PDCP) entity based on configuration information for configuring data duplicate transmission which is received from a base station, a receiver 1630 for receiving a medium access control (MAC) control element (CE) including indication information for indicating activation status change for the plurality of RLC entities, and a transmitter 1620 for duplicately transmitting data using an activated RLC entity.

The controller may change an RLC entity indicated as activation status to the activation status according to the indication information.

For example, the receiver 1630 may receive the configuration information from the base station for configuring a data duplicate transmission function in the UE. The configuration information may include information required for configuring a plurality of RLC entities for processing duplicate transmission for a radio bearer. For example, the configuration information may include RLC index information assigned to each RLC entity for identifying the plurality of RLC entities. The RLC index information may be configured with RLC IDs as identification information for identifying each RLC entity. In another embodiment, the configuration information may include information for indicating initial activation status for each of the plurality of RLC entities.

The controller 1601 may configure the plurality of RLC entities based on the configuration information. When the information for indicating the initial activation status is included in the configuration information, each of the configured RLC entities is configured with activation or deactivation status that corresponds to a state indicated in the initial activation status.

Meanwhile, the plurality of RLC entities may include one primary RLC entity configured to transmit a PDCP control PDU of a radio bearer. The primary RLC entity is a specific RLC entity configured to transmit the PDCP control PDU, and when duplicate transmission is deactivated, a PDCP PDU including the PDCP control PDU may be transferred through the primary RLC entity.

In one embodiment, the primary RLC entity may be always set to activation status. For example, the primary RLC entity may be set to the activation status when the controller 1601 configures the plurality of RLC entities based on configuration information. Thereafter, the primary RLC entity is not transitioned to deactivation status. In another embodiment, even when the primary RLC entity is indicated by the MAC CE as deactivation status, the primary RLC entity may transmit a PDCP control PDU.

In another embodiment, the primary RLC entity may be set as an RLC entity that satisfies any one of the smallest cell group index value, the smallest logical channel ID, and the smallest RLC entity index value among activated RLC entities. That is, the primary RLC entity may be set as an RLC entity that satisfies a preset condition among RLC entities configured with activation status, rather than being set as a fixed specific RLC entity among a plurality of RLC entities.

Meanwhile, the receiver 1630 may receive the MAC CE including information for indicating activation or deactivation for each of the plurality of RLC entities from the base station. The MAC CE may be received after the plurality of RLC entities are configured in the UE.

For example, the MAC CE may include indication information in the form of a bitmap which indicates activation status (e.g., activation or deactivation) of each of a plurality of RLC entities associated with each radio bearer. Here, the bitmap may be configured with only a bitmap for at least one remaining RLC entity except for one primary RLC entity configured to transmit a PDCP control PDU of a radio bearer among the plurality of RLC entities. Accordingly, bitmap information configured in a corresponding MAC CE may be configured with only bits for indicating activation status of at least one RLC entity except for the primary RLC entity that is always configured with the activation status.

When the indication information for indicating activation status (e.g., activation or deactivation) for each RLC entity by the MAC CE is received, based on this, the controller 1610 may change the status of each RLC entity to the corresponding activation or deactivation status. When the RLC entities are changed to the activation or deactivation status, as duplicate transmission data are transferred through an RLC entity in the activation status, therefore, associated transmission paths are changed.

In addition, the controller 1610 controls overall operations of the UE 1600 required to selectively change a duplicate transmission path required to perform the embodiment described above. In addition, the transmitter 1620 and the receiver 1630 are configured to transmit or receive signals, messages, data required to perform embodiments described above to or from the base station.

Figure 17:
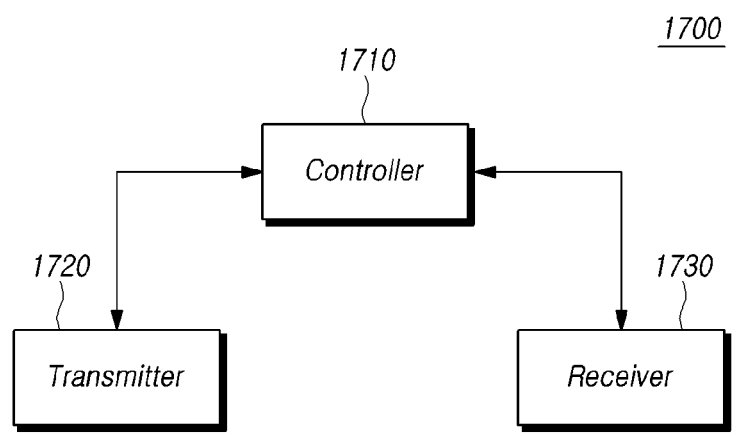
FIG. 17 is a block diagram illustrating a base station according to an embodiment of the present disclosure.

FIG. 17 is a block diagram illustrating a base station according to an embodiment of the present disclosure.

Referring to FIG. 17, a base station for controlling a data transmission of a UE may include a transmitter 1720 for transmitting, to the UE, configuration information for configuring, for the UE, a plurality of radio link control (RLC) entities used for processing duplicate transmission for a radio bearer with being associated with one packet data convergence protocol (PDCP) entity, and transmitting indication information for indicating activation status change for the plurality of RLC entities to the UE, and a receiver 1730 for receiving data duplicately transmitted through an RLC entity activated according to the indication information. The configuration information may include at least one of RLC entity index information for each of the plurality of RLC entities and initial activation status information.

The configuration information may include information required for configuring a plurality of RLC entities for processing duplicate transmission for a radio bearer. For example, the configuration information may include RLC index information assigned to each RLC entity for identifying the plurality of RLC entities. The RLC index information may be configured with RLC IDs as identification information for identifying each RLC entity. In another embodiment, the configuration information may include information for indicating initial activation status for each of the plurality of RLC entities.

Meanwhile, the plurality of RLC entities may include one primary RLC entity configured to transmit a PDCP control PDU of a radio bearer.

In one embodiment, the primary RLC entity may be always set to activation status. For example, the primary RLC entity may be set to the activation status when the UE configures the plurality of RLC entities based on configuration information. Thereafter, the primary RLC entity is not transitioned to deactivation status. In another embodiment, even when the primary RLC entity is indicated by the MAC CE as deactivation status, the primary RLC entity may transmit a PDCP control PDU.

In another embodiment, the primary RLC entity may be set as an RLC entity that satisfies any one of the smallest cell group index value, the smallest logical channel ID, and the smallest RLC entity index value among activated RLC entities. That is, the primary RLC entity may be set as an RLC entity that satisfies a preset condition among RLC entities configured with activation status, rather than being set as a fixed specific RLC entity among a plurality of RLC entities. In addition, such a preset condition may be set by a base station or set in a UE in advance and may be variously set to, for example, the smallest cell group index value, the smallest logical channel ID, or the smallest RLC entity index value. Embodiments described herein are not limited to these preset conditions.

Meanwhile, the MAC CE may include indication information in the form of a bitmap indicating activation status (e.g., activation or deactivation) of each of a plurality of RLC entities associated with respective radio bearers. Here, the bitmap may be configured with only a bitmap for at least one remaining RLC entity except for one primary RLC entity configured to transmit a PDCP control PDU of a radio bearer among the plurality of RLC entities. Meanwhile, the MAC CE may be transmitted after the plurality of RLC entities are configured in the UE.

Specifically, when four RLC entities are configured for each of eight radio bearers, as one RLC entity is set to a primary RLC entity, it is therefore possible to indicate activation status (e.g., activation or deactivation) of the remaining three RLC entities using three values of possible values in predetermined bits such as two bits or three bits for each radio bearer.

In addition, the controller 1710 controls overall operations of the base station 1700 required to selectively change a duplicate transmission path required to perform the embodiment described above. In addition, the transmitter 1720 and a receiver 1730 are configured to transmit or receive signals, messages, data required to perform embodiments or examples described above to or from the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method of a user equipment (UE) for transmitting data, the method comprising:
configuring a plurality of radio link control (RLC) entities used for processing duplicate transmission for a radio bearer with being associated with one packet data convergence protocol (PDCP) entity based on configuration information for configuring data duplicate transmission which is received from a base station;
receiving a medium access control (MAC) control element (CE) including indication information for indicating activation status change for the plurality of RLC entities;
changing an RLC entity indicated as activation status based on the indication information to the activation status; and
duplicately transmitting data using the activated RLC entity,
wherein the MAC CE includes indication information in a form of a bitmap indicating activation or deactivation status of each of the plurality of RLC entities associated with each radio bearer, and
wherein the bitmap indicates activation or deactivation status of one or more RLC entities except for one primary RLC entity configured to transmit a PDCP control PDU of the radio bearer among the plurality of RLC entities.

2. The method according to claim 1, wherein the configuration information includes at least one of RLC entity index information for each of the plurality of RLC entities and activation status information.

3. The method according to claim 1, wherein the plurality of RLC entities includes one primary RLC entity configured to transmit a PDCP control PDU of the radio bearer, and the primary RLC entity is always configured with the activation status.

4. The method according to claim 1, wherein bits for the one or more RLC entities are assigned in ascending order of logical channel identifier (LCID) in a master cell group, and thereafter, assigned in ascending order of LCID in a secondary cell group.

5. A method of a base station for controlling data transmission of a user equipment (UE), the method comprising:
- transmitting, to the UE, configuration information for configuring, in the UE, a plurality of radio link control (RLC) entities used for processing duplicate transmission for a radio bearer with being associated with one packet data convergence protocol (PDCP) entity;
- transmitting a medium access control (MAC) control element (CE) including indication information for indicating activation status change for the plurality of RLC entities to the UE; and
- receiving data duplicately transmitted through an RLC entity activated based on the indication information,
- wherein the configuration information includes at least one of RLC entity index information for each of the plurality of RLC entities and activation status information,
- wherein the MAC CE includes indication information in a form of a bitmap indicating activation or deactivation status of each of the plurality of RLC entities associated with each radio bearer, and
- wherein the bitmap indicates activation or deactivation status of one or more RLC entities except for one primary RLC entity configured to transmit a PDCP control PDU of the radio bearer among the plurality of RLC entities.

6. The method according to claim 5, wherein the plurality of RLC entities includes one primary RLC entity configured to transmit a PDCP control PDU of the radio bearer, and the primary RLC entity is always configured with the activation status.

7. The method according to claim 5, wherein bits for the one or more RLC entities are assigned in ascending order of logical channel identifier (LCID) in a master cell group, and thereafter, assigned in ascending order of LCID in a secondary cell group.

8. A user equipment (UE) for transmitting data, the user equipment comprising:
- a controller configured to configure a plurality of radio link control (RLC) entities used for processing duplicate transmission for a radio bearer with being associated with one packet data convergence protocol (PDCP) entity based on configuration information for configuring data duplicate transmission which is received from a base station;
- a receiver configured to receive a medium access control (MAC) control element (CE) including indication information for indicating activation status change for the plurality of RLC entities; and
- a transmitter configured to duplicately transmit data using the activated RLC entity,
- wherein the controller changes an RLC entity indicated as activation status based on the indication information to the activation status,
- wherein the MAC CE includes indication information in a form of a bitmap indicating activation or deactivation status of each of the plurality of RLC entities associated with each radio bearer, and
- wherein the bitmap indicates activation or deactivation status of one or more RLC entities except for one primary RLC entity configured to transmit a PDCP control PDU of the radio bearer among the plurality of RLC entities.

9. The user equipment according to claim 8, wherein the configuration information includes at least one of RLC entity index information for each of the plurality of RLC entities and activation status information.

10. The user equipment according to claim 8, wherein the plurality of RLC entities includes one primary RLC entity configured to transmit a PDCP control PDU of the radio bearer, and the primary RLC entity is always configured with the activation status.

11. The user equipment according to claim 8, wherein bits for the one or more RLC entities are assigned in ascending order of logical channel identifier (LCID) in a master cell group, and thereafter, assigned in ascending order of LCID in a secondary cell group.

* * * * *